July 27, 1965 C. R. APTHORP, JR., ET AL 3,196,748
MACHINE TOOL CONTROL SYSTEM
Filed Aug. 12, 1963 8 Sheets-Sheet 1
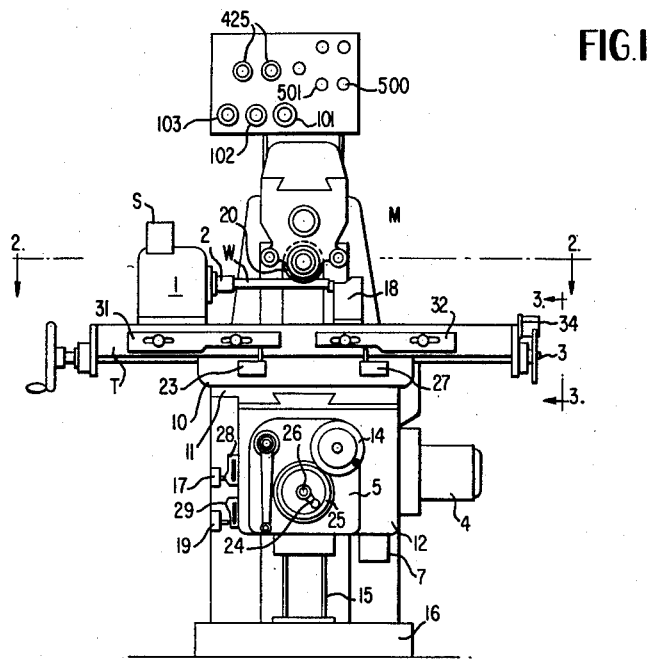
FIG. 1
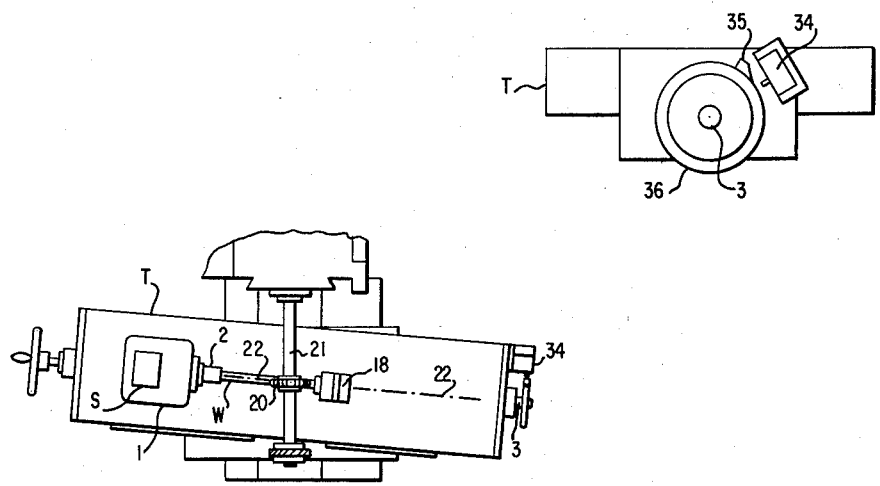
FIG. 2
FIG. 3

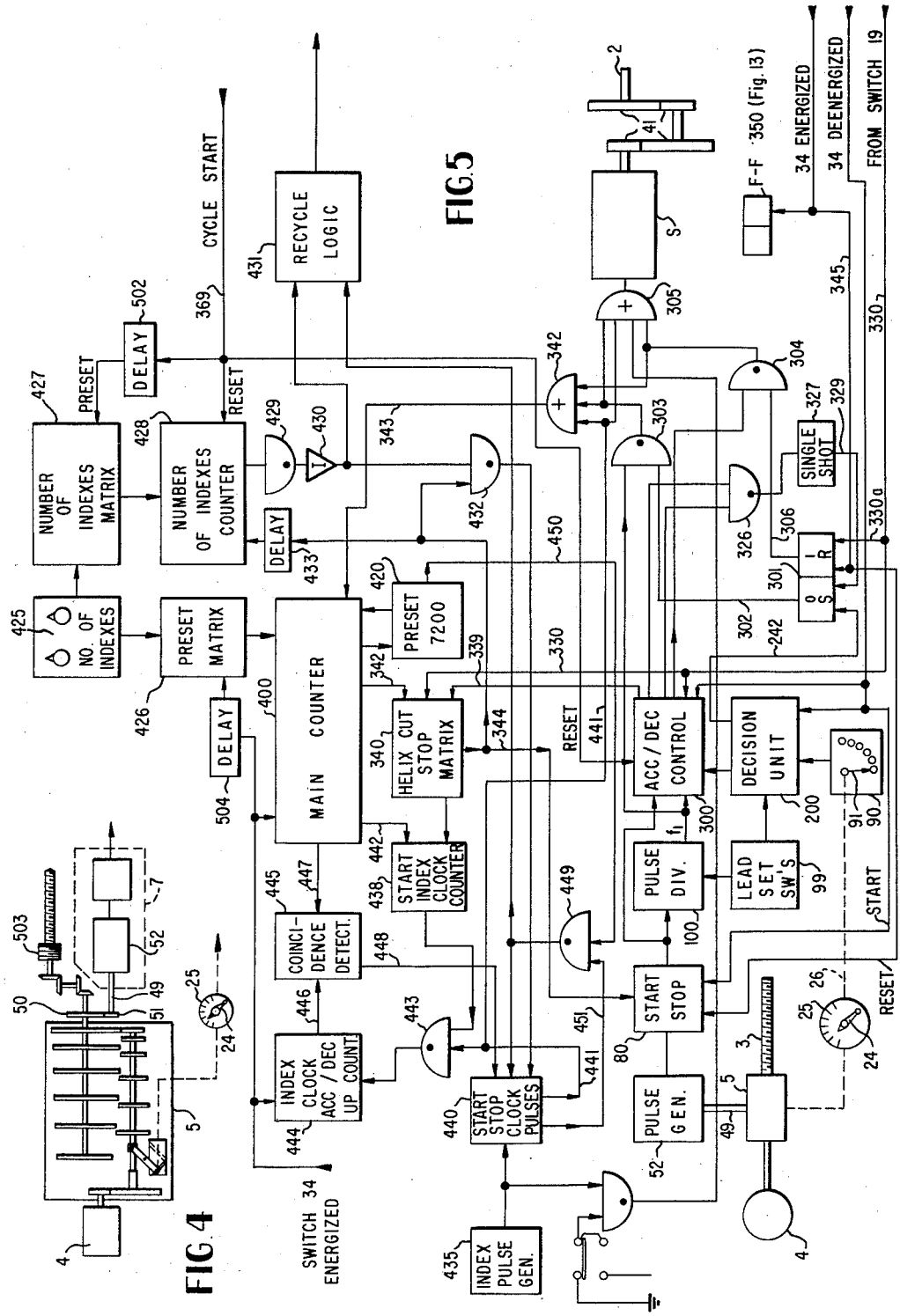

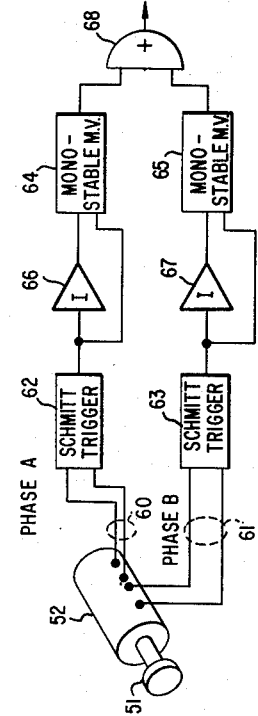
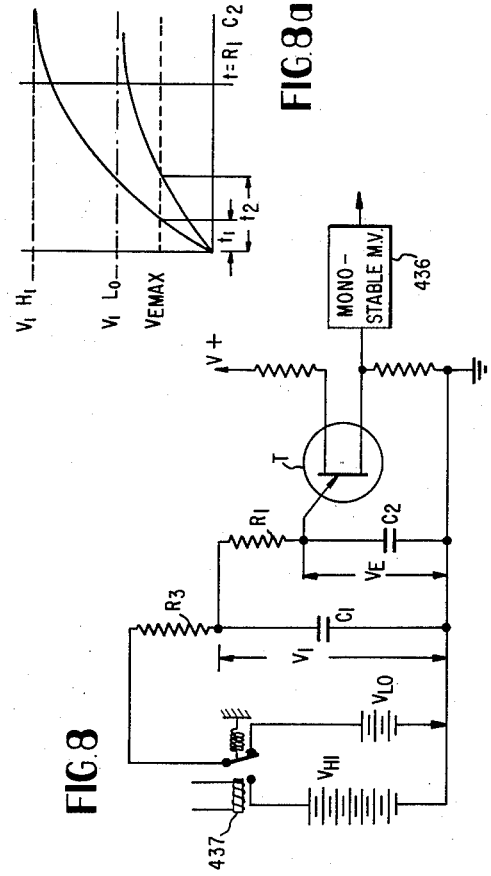
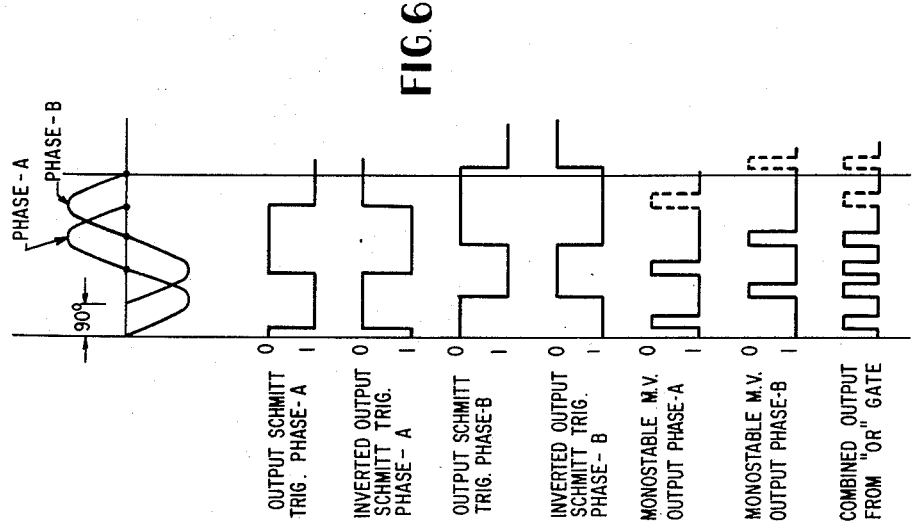

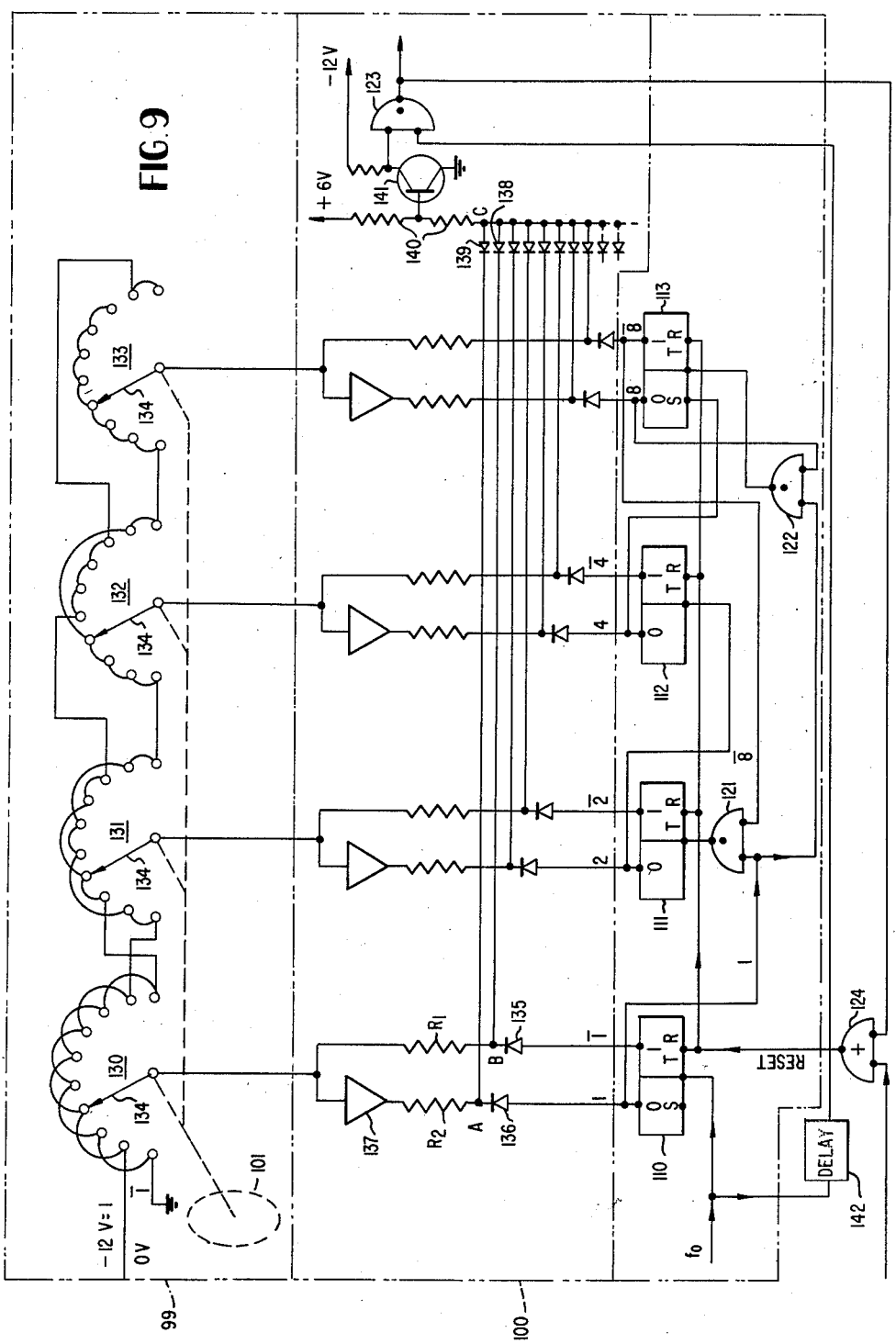

July 27, 1965 C. R. APTHORP, JR., ETAL 3,196,748
MACHINE TOOL CONTROL SYSTEM
Filed Aug. 12, 1963 8 Sheets-Sheet 6

3,196,748
MACHINE TOOL CONTROL SYSTEM

Carl R. Apthorp, Jr., Shaker Heights, Francis A. Foster, Parma Heights, and Robert L. Nekola, Chesterland, Ohio, assignors to The Cleveland Twist Drill Company, Cleveland, Ohio, a corporation of Ohio
Filed Aug. 12, 1963, Ser. No. 301,307
56 Claims. (Cl. 90—11.42)

This invention relates to automatic operating methods and control systems for machine tools, more particularly to such a method and system for a machine tool of the type having a cutting tool, means for holding a workpiece, and means for imparting compound movements to the cutting tool and the holder relative to one another in bringing them into operative relation and executing complex machine operations, such as spiral and helical fluting.

One aspect of the invention pertains to a method and system of the type described for multiple spiral or helical fluting operations requiring indexing of the workpiece between successive flue cutting or grooving operations.

In machine tools having the compound movements referred to, it is essential that each element of the movement be executed in phase or timed relation with every other element and have the proper magnitude. For example, in milling a spiral or helical groove or flute in a workpiece, of circular section, such as in the manufacture of a twist drill, end mill or reamer, the workpiece, which may comprise a cylindrical or conical bar, is customarily mounted in the holder or spindle carried by the headstock on the table of a milling machine; the tool is a rotary mill on a driven arbor which turns on a generally horizontal axis above and transverse or oblique to the spindle axis. The machine table reciprocates along a horizontal path parallel to the spindle axis to travel the workpiece in relation to the cutting tool. During the work or feed stroke of the table the spindle is turned in timed relation to the feed so that the tool generates a helix or spiral about the workpiece and the helix has the desired lead, this operation being repeated, if multiple flutes are to be cut, as many times as required to provide the desired number of spiral or helical grooves or flutes on the workpiece. Between strokes or fluting operations the spindle is rotated or indexed to present the workpiece to the cutting tool at a starting position spaced angularly about the spindle axis from the preceding starting position, the extent of the rotation depending upon the number of flutes to be machined, that is, the circumferential spacing desired, and on the angular position of the workpiece where the cutting of the last groove ended. Before returning the table to starting position after a work stroke, it is customary to shift the table vertically relative to the cutting tool to withdraw the latter from the groove or flute just completed; this eliminates any contact between the cutting tool and the workpiece during the return stroke and permits a rapid rate of table travel to be used relative to the travel rate during the machining stroke.

In mechanical indexing systems of the prior art, the rotation of the workpiece is divided into a predetermined number of indexing steps as by a dividing head used with any one of a number of interchangeable indexing plates. Each of the plates has a number of holes arranged in a circle centered on the plate axis, each hole being adapted to receive a locating pin carried by a crank coaxial to the plate and geared to the member or workpiece through a single revolution in a series of steps equal to the number of holes in the plate circle. The spacing of the holes in the plate circle is varied in the different plates to provide indexing steps of different lengths; each plate may be provided with a plurality of groups of holes arranged in concentric circles and with different numbers of holes in each circle. To change the indexing interval, the crank pin is changed from one circle to another; in some instances the indexing plate must be changed. For the system to be flexible, a large number of indexing plates must be employed. This system of the prior art is cumbersome and inconvenient to use.

Various other systems have been devised for the purpose of achieving automatic or semi-automatic operation of machine tools and to control various and related compound movements of the parts such as the movements referred to above. Some of these have used electrical pulse systems of various types, generally operating from the error signal of a closed loop servo motor; in some cases requiring an elaborate feedback and checking system to insure the correct execution of the commands. While systems heretofore devised have enjoyed a measure of acceptance and success, they have not been completely satisfactory because of high cost, complexity and difficulties in service and repair; more seriously, some prior systems have been inflexible in that a changeover from one to another specification in machining a workpiece has been costly or time consuming or both. Troubles have also been encountered with feedback and other arrangements for error correction.

To machine a helical or spiral groove of a given lead in a workpiece of circular cross-section, the workpiece must rotate at an angular velocity directly proportional to the rate of feed or travel of the workpiece relative to the cutting or grinding tool in the direction parallel to the rotational axis of the workpiece and inversely proportional to the lead. Mechanical helices generating systems have accomplished this result by using a plate type dividing head, such as referred to above, geared to the lead screw of the machine tool feed table. The desired helical groove is thus obtained by using a predetermined gear ratio between the lead screw and the dividing head; to change the lead of the helix being machined, it is necessary to change this gear ratio. Such a system is cumbersome and inconvenient to use, particularly when the machine must be set up frequently, and if the system is to be flexible a large number of change gears are necessary. Furthermore, the choice of leads is limited to the number of gear changes on hand.

To minimize the idle machining time during certain periods of the cycle, the feed table is traversed at a rapid rate, as mentioned above. During such periods, the working parts in the dividing head are subjected to high stresses imposed by large forces built up through the gear train from the machine table lead screw and through to the workpiece driving spindle. These high stresses cause rapid wear and result in high maintenance costs.

It is therefore one of the principal objects of the invention to provide an improved method and system for controlling automatically, compound movements in a machine tool, more particularly to provide such a method and system for generating a helix or spiral about a workpiece.

Another object is to provide, in a control system for a machine having a rotary spindle which holds and transports the work relative to a cutting tool and a work feed drive capable of adjustment to different speeds for effecting such transport, a lead generating arrangement operating to maintain a predetermined relation between the rotational speed of the spindle and the transport drive and adapted automatically to vary the rotational speed of the spindle in synchronism with variations in the transport drive so as to maintain a uniform lead in the machining of the work regardless of the speed for which the work feed drive is set in adjustment and of variations in such speed.

Another object is to provide a method and system of the character referred to for generating a plurality of helices seriatim and spacing them angularly about the axis of the workpiece. This aspect of the invention is especially concerned with an arrangement for indexing the workpiece automatically in accordance with a preselected pattern, special consideration being given to ease of changeover in the setting up of a machine with respect to the number of spiral grooves or flutes to be cut.

Other objects are concerned with the automatic indexing of a work holder in a machine tool so as to present the work to the tool in different positions for carrying out, seriatim, related machining operations. One such object, in its broad aspect, aims to provide an indexing system and method wherein an incremental prime mover actuable by electrical pulses is connected to the work and the position of the work is altered by feeding a predetermined number of electrical pulses to such prime mover. More particularly, the invention is concerned with an indexing system wherein the prime mover is an electrical stepping motor and the pulses for actuating it are fed through a register adapted to limit the pulses to a predetermined number and thereby control the extent of the indexing movement.

Another object concerned with the indexing of a workpiece in a machine tool is to provide a system which permits the number of indexing steps to be readily changed; a further and more specialized object being to provide such a system wherein the indexing drive takes the form of an incremental prime mover and the system readily is capable of dividing a predetermined cycle into many different parts.

In a specialized version of the invention as applied to a machine tool of the type having a rotary spindle for holding the work, the rotation of the spindle for both lead generating and indexing is accomplished by common incremental prime mover means which may be of the electrical stepping motor type, this being a further object of the invention. More specifically, the stepping motor is energized for lead generation by pulses derived from the feed drive of the machine and for indexing by pulses derived independently of the feed.

Another object is to provide a machine of the type having a cutting tool, a work holding spindle mounted for rotary movement about its axis and for movement along its axis relative to the tool with an incremental prime mover for effecting one of said movements, the other of said movements being arranged to provide electrical pulses in timed relation to its speed and such prime mover being controlled by said pulses and adapted to vary the speed of the one movement in response to variations in the speed of the other of the movements so as to maintain a predetermined constant relation between the movements. More specifically, the invention aims to provide in such a machine a pulse generator operatively associated with the drive for one of the movements so as to produce electrical pulses in timed relation to the speed of such one movement and a stepping motor actuated by electrical pulses operatively associated with the drive for the other of the movements, the generator and the motor being electrically coupled for control of the latter by the former. In a specialized version, the stepping motor is connected to drive the spindle in rotary motion and the generator is connected so as to be driven by the feed drive of the machine. Means is provided in the electrical coupling for varying automatically the ratio of pulses generated to pulses fed to the step motor, thereby altering the lead generated during the machining operation.

Another object is to provide, in a machine tool control system of the type referred to and wherein an electrical stepping motor is employed, means for feeding pulses to the motor at a rate which is not faster than the response capability of the stepping motor in starting, but which may increase to a rate approaching the maximum to which the motor can reliable respond in steady operation; likewise, to feed pulses to the motor at a correspondingly decreasing rate in stopping.

Another object is to provide a readily adjustable machine tool indexing system of the character referred to, the accuracy of which is repetitive and the error of which is negligible.

Another object is to provide a readily adjustable helix generating system which permits the lead of the generated helix to be changed with ease.

Another object is to provide a readily adjustable machine tool helix generating system the accuracy of which is repetitive and the error of which is negligible.

Another object is to provide a readily adjustable lead generating system of the type referred to employing an incremental prime mover wherein the lead generated can be controlled independently of the feed rate of the machine tool, and conversely, where the feed rate may be altered independently of the lead.

Another object is to provide a machine tool having a readily adjustable helix generating and indexing mechanism driven from a common incremental prime mover which mechanism is simpler in construction and in operation, requires less maintenance, is more reliable than are corresponding mechanisms of the prior art, and is not dependent for accuracy upon careful manual speed control setting of the machine prime mover by an operator.

Another object is to provide an open loop, completely digital helix generating and indexing system.

Another object is to provide a readily adjustable helix and index generating system which is readily adaptable to numerical control.

Other objects and advantages relate to certain combinations of parts and of process steps which will be evident in the following description of a preferred embodiment representing the best known mode of practicing the invention. This description is made in connection with the accompanying drawings forming part of the disclosure.

In the drawings:

FIGURE 1 is an outline front elevational view of a machine tool embodying the invention.

FIGURE 2 is a plan view, on the line 2—2, of FIGURE 1, showing the table portion of the machine tool.

FIGURE 3 is a detail view of a cam operated switch mechanism taken in the direction of the arrows 3—3 of FIGURE 1.

FIGURE 4 is a diagrammatic view of a portion of the machine tool showing the gear box and helix pulse generating unit.

FIGURE 5 is a general block diagram of a system embodying the invention, as used in the machine tool shown in FIGURE 1.

FIGURE 6 is a pulse diagram of the helix pulse generator unit.

FIGURE 7 is a block diagram of the pulse shaper and multiplier associated with the helix pulse generator.

FIGURE 8 is a wiring diagram of the helix pulse generating unit used in the illustrative embodiment.

FIGURE 8a is a voltage diagram showing how the frequency of the index pulse oscillator is varied.

FIGURE 9 is a block diagram of one decade of the lead set switches, counter, and comparing means of a pulse divider unit.

GENERAL DESCRIPTION OF THE PREFERRED EMBODIMENT OF THE INVENTION

Figure 11:
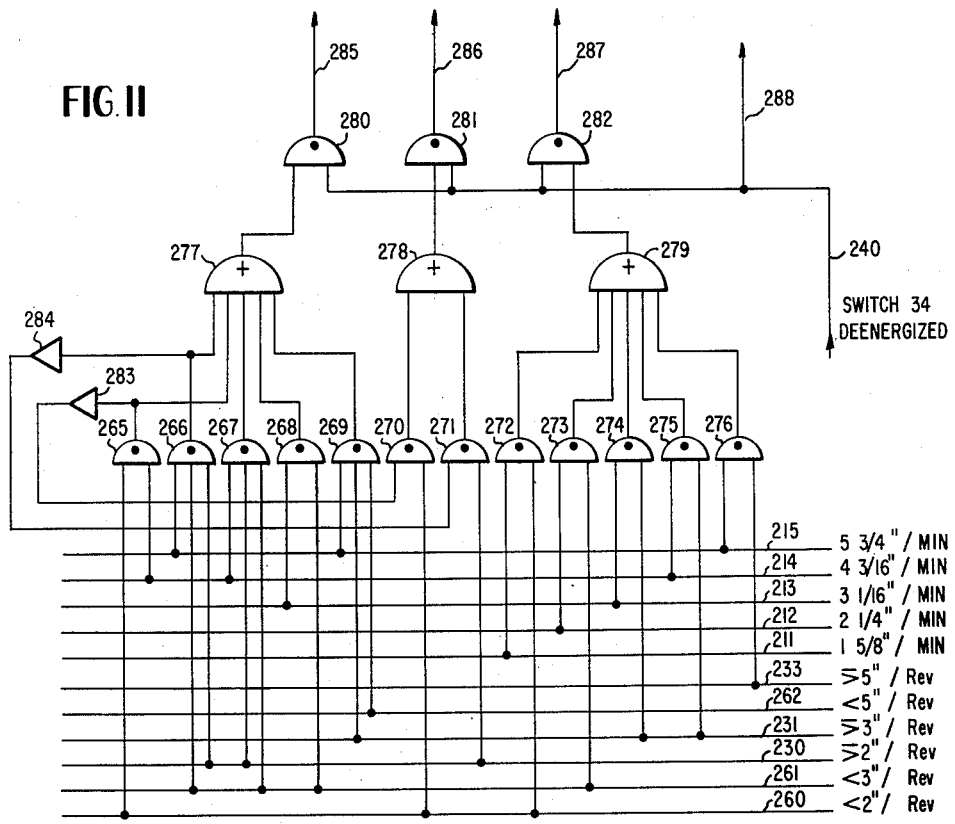
FIGURE 11 is a block diagram of another portion of the decision unit which determines that acceleration and deceleration of pulses are required.

A typical operation performed by the machine which has been chosen to illustrate the invention is the milling of a twist drill. Such a drill is generally milled from a workpiece such as a bar or rod of cylindrical stock, in which several helical grooves or flutes are cut by a milling cutter. The lead of the grooves, that is, the length axially of the rod in which each groove makes one complete turn around the rod, is exactly determined. The method and system for achieving this constitute one aspect of the invention.

The grooves are evenly spaced around the workpiece; if there are four grooves they are spaced 90° apart. Since the relationship between the angular position of the stock at the end of any cut and the beginning of the next cut varies widely, indexing of the workpiece to the correct position for starting the next cut requires a variably controlled operation. The method and system for achieving this constitute another aspect of the invention. Thus, the movements of the workpiece are divided into two different phases: first, helix generation; second, indexing. Helix generation is performed by a compound movement in which rotation of the workpiece is exactly related to feed of the workpiece.

In accordance with the invention, one of these two parts of the compound movement is performed by a positive mechanical driving means, the speed of which can be controlled; while the other part of the compound movement is derived from the first driving means and is performed by a stepping motor driven by pulses having a basic rate generated from the mechanical driving means which produces the first part of the compound movement. The pulse rate may, however, be modified from the stated base rate in a controlled manner to be described presently.

In the preferred form of the invention, the feed rate of the workpiece is produced by a mechanical drive of variably controllable, uniform speed, while the rotary movement is produced by a stepping motor, which receives its energy pulses under the control of a pulse generator driven by the workpiece feed drive and which turns the workpiece through a definite angle in response to each pulse.

In accordance with a special feature of the preferred embodiment of the invention, the indexing of the workpiece is done by the same stepping motor used for helix generation, but the pulses which control the stepping motor during indexing are derived from a different source. This second pulse source may be of any convenient kind capable of delivering pulses of high frequency, such as an astable multivibrator.

In order to index the workpiece from the end of one cut to the point where the next cut is to begin, it is necessary to know the angular position of the workpiece when the first cut is completed. Each pulse supplied to the stepping motor will rotate the workpiece through a definite angle. By knowing the angle between the finish of one cut and the beginning of the next cut it can be determined how many pulses of the stepping motor will be required to move the workpiece through that angle.

In accordance with a special feature of the preferred embodiment of the invention, the angular position of the workpiece is kept track of by a counter, called the "main counter," which is pulsed by the same pulses that operate the stepping motor, in both the helix generation mode and the indexing mode.

For example, it may require 7200 steps of the stepping motor to rotate the workpiece through 360°. If there are to be four indexes, the number of pulses required for one index will be 1800. If the number of pulses delivered to the stepping motor during the generation of the first cut is 1440, the number of pulses to be supplied to bring the workpiece to the next index position will be 1800 minus 1440, or 360. These pulses are supplied by the index pulse system.

The number of pulses per second required to generate a helix varies directly with the feed rate and indirectly with the helix lead. In the system to be described, as an illustrative embodiment of the invention, the rate of pulses for helix generation may vary from a minimum of 2.11 per second to 460 pulses per second. The maximum rate at which the particular stepping motor shown will respond reliably from a stationary condition is 100 pulses per second. But if the motor is properly accelerated, it can respond, without missing, to a pulse rate as high as 1000 pulses per second.

In accordance with the invention, means are provided to accelerate the motor and thereby the workpiece from a stationary condition to a maximum rate of rotation at a defined rate, such that there will be a correct response to every pulse. Thereby, the number in the main counter will truly represent the angular position of the workpiece at all times, and it is unnecessary to provide any other checking or feedback means to insure that the milling operation is proceeding in accordance with the conditions set up.

On stopping the stepping motor it is necessary to proceed through a deceleration operation if the motor is operating at above 100 pulses per second. The pulse rate is therefore reduced at a defined rate from the maximum at which the stepping motor was being driven, to a rate below 100 pulses per second, at which rate the stepping motor can be stopped instantaneously.

In indexing, pulses are supplied at a maximum rate of 670 pulses per second, which is still well below the maximum of 1000 pulses per second, which the stepping motor is able to follow without missing, if properly accelerated and decelerated. Special means of a simple nature are provided for accelerating and decelerating the pulses on indexing, since the maximum rate of 670 pulses per second is constant.

In accordance with another feature of the invention, means is provided to anticipate the arrival of the workpiece at the end of its indexing movement, to begin deceleration, if needed, in time to permit the motor to be brought to a full stop when the workpiece has arrived exactly at the end of its indexing movement.

THE MACHINE TOOL

The control system of the present invention is described in relation to its application to a milling machine of known construction, indicated at M, FIG. 1, the machine being of the type used to mill spiral flutes in a cylindrical workpiece W as in the manufacture of a twist drill or reamer. The milling machine M includes a table T supporting a headstock 1 in which a work holding member or spindle 2 is rotatably mounted on anti-friction bearings. The spindle is driven through suitable gearing by a stepping motor which forms part of a stepping motor unit S, referred to later in more detail, the motor unit being mounted on the headstock to travel with it.

The table T, driven by a rotatable member or lead screw 3, reciprocates along a horizontal path, being suitably supported as on parallel ways for sliding motion across a universal housing 10 carried by saddle 11. The housing is swingable about a vertical axis in adjustment on the saddle, as indicated by the position of the table T in FIG. 2. The saddle is itself slidable in adjustment horizontally along a path normal to the plane of the drawing, FIG. 1, on knee 12, as by means of a hidden cross feed screw rotatable by handwheel 14. The knee 12 is vertically slidable on dovetail ways of, and is carried by, the frame of the machine M; a suitable vertically acting screw or hydraulic assembly 15 footing on base 16 of the machine M is actuatable to raise and lower the knee 12 between predetermined positions as determined by limit switches 17, 19 of a suitable electrical control system, later described. These limit switches are actuated at the desired points in the upward and downward movements of the knee and table assembly by vertically adjustable cam plates 28, 29, respectively, which are carried by the knee 12. The table T is actuated for forward travel, or to the right as viewed in FIGS. 1 and 2, during a work or flute cutting stroke, when the lead screw 3 is rotated in one direction and for reverse travel, or to the left as viewed in the same figures, during a return or recovery stroke, when the lead screw is rotated in the other direction. Limit switches 23 and 27 on the housing 10 and connected in the electrical system referred to, are actuated at the desired limits of the forward and reverse movements of the table by horizontally adjustable cam plates 31, 32 mounted on the front side of the table T, to cause the table to stop, as will appear. A conventional constant speed electric motor 4 carried by the knee drives the lead screw 3 through hidden gearing contained in a change speed gear box 5 incorporated in the knee and by means of which the rate of travel of the table T and therefore the cutting rate or feed rate can be carried in accordance with well known arrangements. The feed rate is set manually as by a feed change crank 24 mounted on a shaft 26 which projects through the front of the knee 12; a feed indicator dial 25 concentric to the axis of the feed change shaft is provided to indicate the feed rate for which the machine is set.

It is desirable to provide on and fast to the table T a suitable, steady rest or tail stock 18 for supporting the outboard end of the workpiece W distal from the headstock 1.

A cutting tool such as a milling cutter 20 is mounted on horizontal arbor 21 of the machine M. It is driven constantly in the usual manner when the machine is in operation to rotate at suitable speed about the axis of the arbor 21. Such axis is normal to the plane of the drawing and oblique to and spaced above longitudinal axis 22 (FIG. 2) of the workpiece W about which the latter turns and along which it reciprocates when the supporting table T is actuated for work and return strokes.

In the lowered position of the table, as determined by the setting of the cam plate 29 which governs the limit switch 19 the workpiece W is wholly below or removed from the relative path of the cutter, permitting return travel of the table to starting position with the cutter clearing the workpiece and without necessity for retracting the cutter through the flute or groove formed in the just completed cutting or fluting operation. The function of the switch 17 will be described later.

During the machining part of the machine cycle the spindle 2 is turned by the stepping motor unit S at a controlled rate of rotational speed in order to generate a helix. This is accomplished by feeding pulses to the stepping motor unit in timed relation to the rate of table feed, by a helix generation control system, later described, that includes a pulse generating unit 7, which includes a pulse generator, hidden in FIG. 1, but to be identified later. The pulse generator is driven by, or at a speed proportional to, the speed of rotation of the lead screw 3 and is conveniently mounted in the casing of the pulse generating unit 7 against the underside of the knee 12. It is provided with a direct connection to the gear train between the motor 4 and the lead screw, as indicated diagrammatically in FIG. 4 and described in more detail presently.

In order to achieve a high degree of accuracy in the relationship between the starting of the forward or work travel of the table T and the energization of the stepping motor unit S, a limit switch 34 is mounted on one end of the table T, the right-hand end as viewed in FIGS. 1 and 2, and is actuated by a finger 35 (FIG. 3) on a circular disc 36 fast on the end of the lead screw 3 which projects through the end of the table. Thus the switch 34 is actuated at a precise point in the rotation of the lead screw so that in machining multiple flutes in a workpiece the generation of each succeeding helix is started with the table T in the same position as in the preceding machining operation. This feature contributes to the accuracy of the circumferential spacing of the several helical flutes and thus improves the quality of the work.

Travel of the table T to the right, as viewed in FIGS. 1 and 2, is referred to herein as forward travel for the reason that the control and operation of the machine is described in relation to a method of machining in which the cutter 20 is initially brought into operational engagement with the workpiece W at the end of the latter remote from the spindle 2, each machining operation progressing from right to left from the outboard or distal end of the workpiece toward the end thereof held by the spindle. However, the invention is applicable to reverse machining in which at the beginning of a fluting operation the table T is at its limit of movement to the right, as viewed in the figures just referred to, and travels from right to left during the machining operation. In such reverse machining the cutter 20 initially engages the workpiece W adjacent the left end of the latter which is held by the spindle 2 and travels toward the outboard or distal end. Moreover, the invention can be used with either climb milling or conventional milling type of cut.

HELIX GENERATION

A general block diagram of the system for control of helix generation and indexing in the illustrative embodiment appears in FIGURES 4 and 5. The constant speed motor 4 drives the lead screw 3 through the change speed gear box 5, at a rate corresponding to the setting of the pointer 24 on the indicator dial 25. The shaft 49 of a pulse generator 52 is driven through gears 50, 51 so as to generate pulses at a basic rate determined by the setting of the feed indicator dial 25. The basic pulse rate is thus always in fixed ratio to the speed of the lead screw, which determines the feed rate of the workpiece in relation to the cutter.

PULSE GENERATING UNIT

Any suitable mechanism can be used as the pulse generator 52, which will produce a fixed number of cycles per revolution of the machine drive or lead screw, so that its output frequency will be a precise measure of the machining feed rate. One such generator is the Model 2710500 Optical Incremental Shaft Encoder, manufactured by Dynamics Research Corporation, Stoneham, Massachusetts. This shaft encoder 52 (FIG. 7), when rotated, produces two low-voltage sine waves displaced by 90° (FIG. 6). Each turn of the encoder produces 500 cycles per phase. From these two sine waves 2,000 pulses per revolution of the shaft encoder are generated by doubling circuits now to be described with reference to FIGS. 6 and 7.

The two sine waves, phases "A" and "B," are fed from pulse generator 52 through wires 60 and 61 separately to two Schmitt triggers 62, 63, respectively. The Schmitt triggers may be of the type disclosed in an article in Electrical Design News, June 1961, pages 64 through 69, entitled "A Transistorized Schmitt Trigger." The sine waves are changed to two square waves (see FIG. 6), whose widths are slightly less than ½ the sine wave cycle and whose level and magnitude can be used directly in the rest of the control system.

The square wave outputs of the Schmitt triggers are fed to respective parallel networks. One leg of each network feeds the square wave directly to a monostable multivibrator 64, 65, which may be of the type shown in Millman and Taub, McGraw-Hill, 1956, Chapter 18, Sect. 24, "Pulse and Digital Circuits," while in the other leg of each of the networks an inverter 66, 67 inverts the square wave and then feeds it to the same monostable multivibrator. Because of these two inputs (one direct and one inverted), the monostable multivibrator will be triggered twice, once for each level change, providing two pulses which double the frequency. The time constant of the monostable multivibrator is much less than the width of the square wave, therefore, the monostable multivibrator will return to its normal state before the next level change occurs. The output pulse width is 6 microseconds.

The square waves in the two channels are converted in the manner shown in the second through seventh wave diagram of FIG. 6 into two series of pulses out of phase and are fed to an OR-gate 68 in which they are combined into a single pulse train shown in the last wave diagram of FIG. 6, which has four times the frequency of the shaft encoder. Thus, for each turn of the shaft encoder, 2,000 pulses are generated at the output of the OR-gate.

The motor of the stepping motor unit S, shown at the lower right end of FIG. 5, has 120 steps per revolution and the work-holding spindle 2 is geared 60:1 to this stepping motor by reduction gearing 41. Therefore, the stepping motor requires 7200 pulses to rotate the work-holding spindle through one revolution. If the desired helix has a 1-inch lead per revolution and the feed rate is 1-inch per minute, the pulsing rate required of the pulse generator system would be 7200 pulses per minute.

Since 7200 pulses are required to rotate the workpiece one complete turn, the required pulse rate to generate a helix with a 1-inch lead at a 6"-per-minute feed rate is:

$$\text{Pulse Rate} = \frac{\text{Pulses}}{\text{Rev.}} \times \frac{1}{\text{Lead}} \times \text{Feed Rate} = \frac{7200P.}{\text{Rev.}}$$

$$\times \frac{1 \text{ Rev.}}{\text{inch}} \times \frac{6 \text{ inch}}{\text{min.}}$$

Pulse Rate = (7200 pulses × 6 inches) min. = 43,200 p.p.m. = 43,200/60 = 720 pulses/sec.

The ratio of the gears 50, 51 driving the pulse generator is 9:1, therefore the shaft of the pulse generator rotates 9 times faster than the lead screw. If the pitch of the lead screw is .25" and the feed rate is 6"/min. the screw will rotate at 24 r.p.m. (6 divided by ¼) and the shaft encoder will rotate at 9×24=216 r.p.m.

At this rate of rotation, the shaft encoder will generate 216 times 2,000 p.p.m.=432,000 p.p.m.=432,000/60= 7200 p.p.s.

Since the pulse rate required is 720 p.p.s., the pulse rate delivered from the pulse generator must be divided by ten. This is accomplished by a pulse divider, which will be described presently.

If the feed rate is changed to N-inches per minute, the pulse generating system, by reason of its positive driven relationship, will change its pulse rate to N times the rate required to generate a helix with a one-inch lead at 1-inch per minute; that is, the pulse rate will be N×7200 pulses per minute. The pulse rate of the generator is directly proportional to the feed rate. This basic pulse rate, which varies with the feed rate, will hereinafter be called the $f_0$ pulse rate.

In the machine now being described, the pulse rate $f_0$ is determined by the feed rate in accordance with the following formula:

$f_0$=Pulse Generator r.p.m.×2000×1 min./60 sec.
  Pulse Generator r.p.m.=9×Lead Screw r.p.m.
  Lead Screw r.p.m.=Feed Rate÷¼ (Lead of Table Screw)
∴$f_0$=9×(Feed Rate÷¼)×2000×1/60=1.2×10³×Feed Rate Using this formula for the particular feed rates provided by the feed gear box of this machine, the following table shows the resulting pulses per second:

| Feed rates: | p.p.s. |
|---|---|
| 1³⁄₁₆ | 1425 |
| 1⅝ | 1950 |
| 2¼ | 2700 |
| 3¹⁄₁₆ | 3675 |
| 4³⁄₁₆ | 5025 |
| 5¾ | 6900 |

If, at the same feed rate, the lead of the helix is to be doubled, it is necessary to halve the pulse rate. Similarly, to triple or quadruple the lead, one-third or one-fourth, respectively, of the pulse rate is required. The pulse rate to the stepping motor must be inversely proportional to the lead of the helix, as well as being directly proportional to the feed rate.

The pulse rate of 7200 pulses per minute for a helix with a 1" lead and a 1" per minute feed must be changed for any combination of feed rate and lead according to the following relationship:

*Equation I*

$$\text{p.p.m.} = \text{desired pulse rate per minute} = 7200 \times \frac{\text{feed rate in in./min.}}{\text{lead of helix in in./rev.}} = \text{angular velocity of work}$$

$$\times \text{ constant}$$

One factor of Equation I: feed rate in in./min., is derived directly from the feed gear box. The other factor must be set up on lead-set switches 101, 102, 103 (FIG. 1) of a lead set switch group 99 (FIG. 5), which control a pulse divider 100. In the particular machine being described the three switches 101, 102, and 103 have the respective ordinal values tenths, units, and tens, the decimal place coming between the switches 101 and 102. If a finer control of helix lead were desired additional switches to the right of switch 101 could be added. The pulses of pulse rate $f_0$ are fed from OR gate 68 of FIG. 7 to a control block 80 which determines the time of starting and stopping of pulses to pulse divider 100.

PULSE DIVIDER AND LEAD SET SWITCHES

The pulse divider used in the preferred embodiment of the invention being described, comprises a three-decade binary-coded decimal "up" counter as shown in "Hand Book of Semiconductor Electronics," Lloyd P. Hunter, McGraw-Hill, 1956, Chapter 15, Section 56. This counter will count up to any number determined by the lead set switches 101–103 and will then in conjunction with a coincidence detection network issue an output pulse. The counter is thus able to divide the pulses $f_0$ fed to it, by a number set up on the switches. The switches are coupled to the counter by a coincidence detecting network. One decade (the least significant one) of the three-part system comprising switches, counter and coincidence detecting network is shown in FIG. 9.

The decade is composed of four bistable multivibrators (flip-flops) 110, 111, 112, and 113, connected in an RST manner (Reset, Set, Trigger), as shown in National Bureau of Standards Circuit No. 12, multivibrator, bistable (150 kc.), and two diode resistance AND-gates, 121, and 122, similar to those illustrated in Logical Design of Digital Computers, Montgomery Phister, Jr., John Wiley & Sons, 5th printing, April 1960, pages 22 and 23. The flip-flops and AND-gates are combined to form a four-bit binary coded decimal up counter which counts in binary form through 9 and resets on the tenth pulse. In each bit position of the counter a negative voltage on the right side indicates a 1̄, while a negative voltage on the left side indicates a 1 in that position. In the normal zero state of the counter, the four stages all have negative voltage output on the right side, as indicated by the 1 in the box on that side and ground voltage on the output of the left side as indicated by the 0 on the left side.

The basic operation of the single decade of the counter shown in FIG. 9 will be described, with reference to Table I, assuming that the counter stands at zero and that pluses $f_0$ are fed to the T terminal of the one-bit flip-flop 110. The one to zero transition of the first pulse into the counter changes flip-flop 110 to the 1 state; that, is it has a negative voltage on its left output as indicated by the 1 next to this output; 1 and $\bar{1}$ above the flip-flop have the significance that a negative voltage at the left output shows that the flip-flop is at a binary one, while a negative voltage at the right output means the flip-flop is at $\bar{1}$ or binary 0. Now AND-gate 121 is enabled because both of its inputs (1 and $\bar{8}$) are in the 1 (negative) state. The 1 output of the gate is fed to the T input of the two-bit flip-flop 111. After the first pulse, the states of the flip-flops are as shown in Table I, on the line identified by pulse No. 1, and the output of the counter is a binary 1.

*Table I*

| 8 | $\bar{8}$ | 4 | $\bar{4}$ | 2 | $\bar{2}$ | 1 | $\bar{1}$ | No. of Pulse |
|---|---|---|---|---|---|---|---|---|
| 0 | 1 | 0 | 1 | 0 | 1 | 0 | 1 | 0 |
| 0 | 1 | 0 | 1 | 0 | 1 | 1 | 0 | 1 |
| 0 | 1 | 0 | 1 | 1 | 0 | 0 | 1 | 2 |
| 0 | 1 | 0 | 1 | 1 | 0 | 1 | 0 | 3 |
| 0 | 1 | 1 | 0 | 0 | 1 | 0 | 1 | 4 |
| 0 | 1 | 1 | 0 | 0 | 1 | 1 | 0 | 5 |
| 0 | 1 | 1 | 0 | 1 | 0 | 0 | 1 | 6 |
| 0 | 1 | 1 | 0 | 1 | 0 | 1 | 0 | 7 |
| 1 | 0 | 0 | 1 | 0 | 1 | 0 | 1 | 8 |
| 1 | 0 | 0 | 1 | 0 | 1 | 1 | 0 | 9 |
| 0 | 1 | 0 | 1 | 0 | 1 | 0 | 1 | 10 |

The second pulse changes flip-flop 110, the one-bit, to the zero or $\bar{1}$ state and AND-gate 121 is disabled. The one to zero transition of this AND-gate, applied to the T input of flip-flop 111 switches the flip-flop. After the second pulse the condition of the four-flip-flops is as shown in Table I.

As further pulses are transmitted to the T input of flip-flop 110 the stages of the binary counter go through the normal binary progression in obvious manner until the eighth pulse. At the time this pulse arrives the state of the flip-flops is as shown in Table I after the seventh pulse. The eighth pulse switches the 1-bit flip-flop to the reset state and the 2 and 4 bits follow in the normal progression. The 1-to-0 transition from the left output of the flip-flop 112 applies a pulse to the set input of flip-flop 113, switching it to the set or one state. AND-gate 121 is now disabled by the 0 output from the $\bar{8}$ terminal of flip-flop 113, while the AND-gate 122 is partially conditioned by the 1 output from the 8 terminal of flip-flop 113. At this time the flip-flops stand in the condition shown after pulse 8 in the table.

The ninth pulse changes flip-flop 110 and its 1 state is transmitted to AND circuit 121, which does not respond, because of the $\bar{1}$ condition on its right-hand input. AND-gate 122 is enabled by the same 1 pulse from flip-flop 110, left output, and sends a 1 to the T terminal of flip-flop 113. The four bit position now stands as shown in the table after pulse 9.

The tenth pulse resets flip-flop 110, with no effect on flip-flop 111, but flip-flop 113 is reset by the 1-to-0 change from AND-gate 122. The four stages now stand as shown after pulse 10 in Table I.

The 8 output of flip-flop 113 is connected to the T input of the one-bit flip-flop of the next higher order decade of the counter (not shown). Thus, the return of flip-flop 113 to the reset state on the tenth pulse sends a one-to-zero transition pulse to the one-bit flip-flop of the next higher order decade and adds a one to that decade. A similar coupling is provided between the second and third order decades.

The three-decade storage system controlled by the lead set switches 101–103 determines the number to which the three-decade counter will count before an output signal is issued. Again, only the least significant decade of the lead set switches is shown in FIG. 9. Each index of the switch corresponds to a unique decimal number between 0 and 9. The ordinal weight assigned to the number is determined by its position from left to right, that is, whether it is in the $10^1$, $10^0$ or $10^{-1}$ decade.

The switch has four wafers 130, 131, 132, 133 ganged on a single shaft and is so wired as to produce a binary number in the 1–2–4–8 form, reading from left to right in the wiring diagram, equal to the decimal number represented by the index to which the switch is set. The first wafer 130 contributes the $2^0$, the second the $2^1$, the third the $2^2$, and the fourth the $2^3$. For example, when a decimal 3 is selected on a switch, the output from the switch lines will be binary 3 as shown below, where the order of the bits is reversed:

| 8 | 4 | 2 | 1 |
|---|---|---|---|
| $2^3$ | $2^2$ | $2^1$ | $2^0$ |
| 0 | 0 | 1 | 1 |

The arms 134 pertaining to the respective switch wafers are coupled to the outputs of the corresponding bit positions of the counter by the coincidence detector network, one position of which will now be described.

Taking the wafer pertaining to the bit position $2^0$, at the left end of the row, it will be noticed that the index terminals of the wafer are wired in overlapping alternate arrangement, all of the odd numbered terminals being wired to —12 volts, which represents a binary 1, while the even terminals are all wired to 0 volts, representing a binary 0, or $\bar{1}$. Thus, with the setting shown, the arm of this section of the switch is connected to —12 volts.

In the related position of the counter, the $\bar{1}$ output is wired through diode 135 to resistor R1, while the $\bar{1}$ output terminal is connected through diode 136 to resistor R2. Resistor R1 is connected directly to the arm of the switch, while resistor R2 is connected to the arm through an inverter 137.

The junctions of diode 135 and resistor R1, and of diode 136 and resistor R2, are connected through respective wires and reversely directed diodes 138 and 139, respectively, to the end of a resistor 140 which has +6 volts at the other end and is center tapped to the base of a transistor 141.

With the setting as shown in FIG. 9, the level of the voltage on both sides of R2 is 0 and therefore the voltage at A and at the cathode of 139 will be positive with respect to the plate, thereby back-biasing the diode, allowing only leakage current to flow through it. The voltage level across R1 is at logic 1 because both sides of the resistor have the same voltage level, namely —12 volts. Therefore, the level at point B will be a 1. This will make the cathode of 138 negative and the diode will be forward biased to conduct; the voltage at C will be approximately at the 1 level, thus the inverter 141 will have a 1 on its base and its output to AND-gate 123 will be 0.

When the next pulse triggers the binary counter to the 1 state, there will be coincidence between the switch setting and the state of flip-flop 110. Diode 136 will have a 1 on its plate and will be back-biased, therefore, the level at A will be approximately $\bar{1}$ or 0 volts. Diodes 135 will have a 0 on its plate and will be forward-biased, therefore, the level at B will be approximately 0 also. Now, there are zeros on the cathodes of diodes 138 and 139 and they are back-biased.

If these were the only two connections affecting the voltage on the base of the inverter, it would now change to a non-conducting state and a 1 would be delivered to the AND-circuit 123. However, the condition of the inverter 141 is affected by the same comprising circuits of all bit positions of all three decades; it is necessary for all of the diodes such as 139 and 138 to be back-biased, before the voltage on the base of the inverter can rise to change its condition to put a 1 on its output. When this occurs, the same pulse which caused the last change of the counter, and which is delayed by delay circuit 142, provides the other input to AND circuit 123 and causes a 1 output. The same pulse passes through OR circuit 124 to reset the counter.

The output from AND circuit 123 occurs after a number of $f_0$ pulses equal to the number set in the lead set switches has been delivered to the counter. Thereby, the frequency $f_1$ of the pulses issuing from the pulse divider 100 is such as to cause the stepping motor to turn at the correct rate to generate a helix with the desired lead, subject to further conditions to be described next.

DECISION UNIT

In accordance with the invention, the pulses that step the motor are counted to record the angular position of the workpiece. In the illustrative machine being described, each pulse rotates the workpiece 1/7200 of a turn. If the stepping motor does not move a step for each pulse it receives, the accuracy and repetitive ability of the helix generating and indexing system are destroyed. One limiting characteristic of the stepping motor is that it cannot be started or stopped instantaneously at pulse rates greater than 100 pulses/seconds; however, it can accurately step at rates up to 1000 pulses/second if it is accelerated from 100 pulses/second, or less, to 1000 pulses/second and decelerated from 1000 pulses/second to 100 pulses/second, or less. Should it be subjected to excessive starting pulse rates, it will react erratically; either it will not respond to each pulse, or it will not start at all. Since the system requires the motor to operate over a pulse range of 2.11 through 460 pulses/second, malfunction could occur in the range between 101 and 460 pulses/second.

The pulse rates, therefore, can be divided into two ranges: one (2.11 to 100 p.p.s.) over which the pulses can be fed to the motor directly, and one (101 to 460 p.p.s.) over which the pulses must be accelerated and decelerated to be within the response range of the motor.

Thus, if the pulse rate $f_1$ from the pulse divider 100 is less than 100 p.p.s., then these pulses can be fed immediately to the stepping motor unit S, since the motor can respond from a stationary condition to pulses of this rate. This could be the case if, for example, the feed rate were set on the dial 25 to $3\frac{1}{16}''$/min. and the helix lead were set on the switches 101–103 at 04.0, that is, 4"/rev. The pulse rate $f_1$ would then be 92/sec.

But if the pulse rate $f_1$ is greater than 100 p.p.s., it is necessary to go through the acceleration procedure, as previously stated, in order to bring the stepping motor up to a speed at which it will respond to every pulse of the selected pulse rate $f_1$. Likewise, the deceleration procedure must be followed before stopping the stepping motor at the end of the cut.

Figure 10:
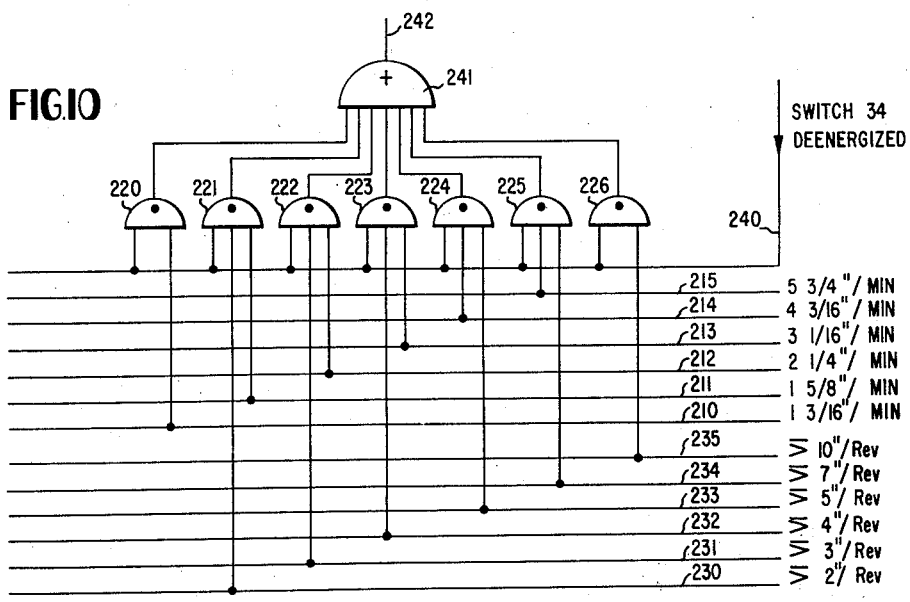
FIGURE 10 is a block diagram of a portion of the decision unit which determines that no acceleration or deceleration of the pulses are required.

The decision as to what pulse rate is required to generate the particular helix selected, is made by the decision unit shown at 200 in FIG. 5 and in greater detail in FIGS. 10 and 11. This unit is under the control of the lead set switch group 99 and a feed set switch group 90, the switch arm 91 of which is fixed to the shaft 26, of feed setting arm 24. The decision unit 200, in turn, sets up a unit 300, which directly controls the acceleration-deceleration procedure. The latter unit switches the pulses of $f_1$ frequency directly to the stepping motor, if the pulse rate $f_1$ is below 100 p.p.s., but if it is greater than 100 p.p.s., the acceleration-deceleration control unit operates to alter the pulse train to conform to the motor response capability.

The decision unit 200 consists of two AND-gate matrices; one matrix, FIG. 10, detects settings calling for pulse rates below 100 p.p.s., and provides a signal to direct pulses of frequency $f_1$ from the pulse divider 100 to the motor; the other matrix, FIG. 11, detects settings requiring pulse rates greater than 100 p.p.s., inhibits pulses directly from the pulse divider 100 to the motor, and engages the acceleration-deceleration control unit 300, which alters the pulse train to conform to motor response capabilities.

As previously stated, the machine has a 6-step feed rate range from $1\frac{3}{16}$ to $5\frac{3}{4}$ inches per minute; it also has a lead generating range of 1.5 inches per revolution through 67.5 inches per revolution, as controlled by the leads set switch group 99.

The AND-gates of the matrix shown in FIG. 10 are connected in the pattern indicated, by six wires 210–215 labeled $1\frac{3}{16}$ to $5\frac{3}{4}''$/min., respectively. These wires are respectively connected to correspondingly valued contacts of the feed set switch 90. The arm 91 of this switch is selectively connected to these contacts by the swinging of the feed indicator dial arm 24 to shift the speed control gears of the feed gear box 5. The arm is supplied with current from a −12 volt source and, according to its position, partially conditions one of the six AND-gates of FIG. 10 labeled 220–225. A seventh AND-gate 226 is not affected by the feed control switch group.

The AND-gates 221–225 are additionally partially conditioned, and AND-gate 226 is partially conditioned, by inputs from another set of six wires 230–235, as shown, connected to extra sections of the units and tens decades of the lead-set dial switches 102 and 103. The connections of the wires to these extra sections of the switches 102 and 103 is such as to generate the inputs, on the respective wires shown by legends in FIG. 10. The AND-circuit 220 is not affected by any wire of the group 230–235. Each of the AND-circuits 220 to 226 is additionally partially conditioned by an input on wire 240 which comes from a monostable multivibrator (not shown) that is triggered by switch 34 (FIG. 3) when it is de-energized, that is, released by cam 35.

The following is an explanation of the operation of the matrix shown in FIG. 10, that determines when no acceleration or deceleration is required.

Figure 12:
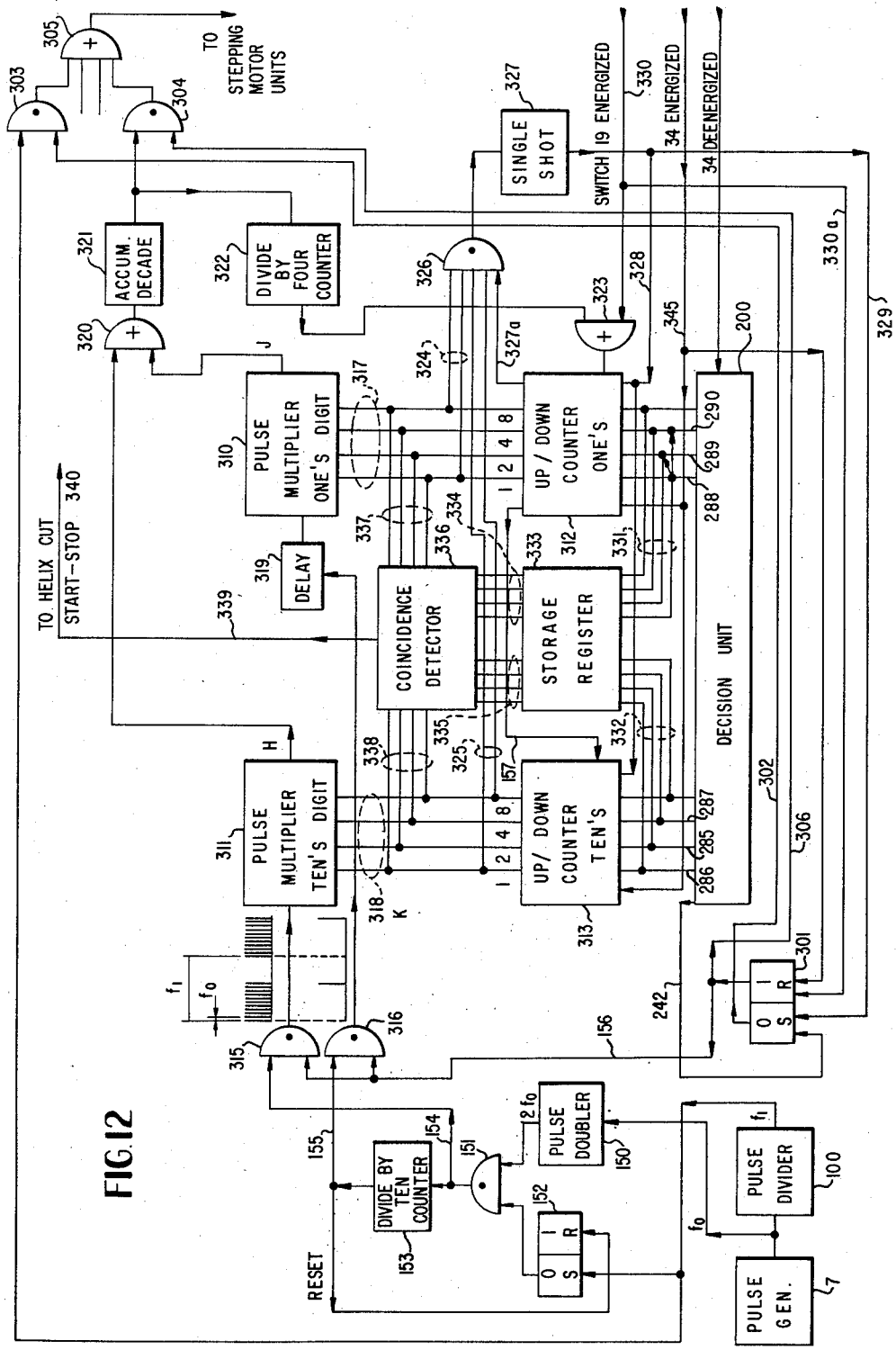
FIGURE 12 is a general block diagram of the acceleration-deceleration control unit.

The matrix detects that the pulse rates are less than 100 p.p.s. by combining a feed rate setting with a lead setting such that the minimum lead setting in the range pertaining to the particular wire 230–234 will not require pulse rates higher than 100 p.p.s. When a condition, for example, a feed rate setting of $3\frac{1}{16}''$/min. and a lead which is equal to or greater than 4"/rev. have been set on the proper dials of the machine, the pulse rate to the motor is approximately 92 p.p.s., 91.875 p.p.s., as can be determined by applying the formulas previously referred to. It can be seen from FIG. 10 that AND-gate 223 is partially enabled, by an input from wire 213 pertaining to "$3\frac{1}{16}$/min." of the feed rate set switch and wire 232 pertaining to "equal to or greater than 4"/rev.," on the lead-set switches. The AND-gate 223 is finally conditioned by an input on wire 240. The signal from AND-gate 223 passes through OR-gate 241 and by wire 242, to set flip-flop 301 (FIGS. 5 and 12). The 1 condition on the left side of this flip-flop is communicated by wire 302 to partially condition AND-gate 303 to allow pulses of frequency $f_1$ to be transmitted through OR-gate 305 directly to the stepping motor unit S, a detailed description of which will follow later. The zero condition on the right side of flip-flop 301 is communicated through wire 306 to AND-gate 304, disabling this AND-gate and blocking pulses from control unit 300.

ACCELERATION AND DECELERATION REQUIRED

If the combination of settings of the lead set switches and the feed set switches is such as to require a pulse rate greater than 100 pulses per second, the decision unit 200 will receive a setting such as to require the pulses to pass through the pulse multiplier section of the acceleration-deceleration control unit 300, whereby their rate will be reduced to a frequency below 100 pulses per second initially and built up at a predetermined speed to the full $f_1$ rate delivered from the pulse divider 100. At this time the pulses will be switched, as will be described so as to be fed directly from the pulse divider 100, for the duration of cutting of the helix. When the helix has been completed and the cutter withdrawn from the workpiece, the acceleration-deceleration control unit 300 will come into play again to reduce the pulse rate from the $f_1$ frequency down to a frequency below 100 pulses per second, at which time the stepping motor can be stopped instantly.

To explain the action of the acceleration and deceleration of pulses, an example will be taken of a 1.5″/rev. lead and a 5¾″/min. feed, which calls for a pulse rate of 460 p.p.s., well over the instantaneous starting-stopping rate of the motor.

The higher pulse rate required in this example is detected by the second switch matrix of the decision unit 200 shown in FIG. 11. This switching matrix resembles the one shown in FIG. 10 previously described, except that the inputs to the sets of wires leading to the various AND-gates are different, as shown by the legends at the ends of these wires. In this case, of the feed rate wires, only wires 211–215 are used, which extend from the contacts of switch group 90 in the range from 1⅝″/min. to 5¾″/min. The lead-set switch wires include wires 230, 231, and 233 shown in FIG. 10 and three additional wires 260, 261, and 262, with the inputs shown in the legends.

The outputs from the AND-gates 265–276 lead through three OR-gates 277–279, in the pattern shown. The OR-gates feed respective AND-gates 280, 281, and 282. Inverters 283 and 284 permit AND-gates 270 or 271 to be partially conditioned when AND-gates 265 or 266 are not fully conditioned, as will be shown in the chosen example. The combination of an input on wire 260, partially conditioning AND-gate 270, leads to full conditioning of that AND-gate by the inverted output of AND-gate 265, due to the absence of an input on wire 214. Outputs on the lines 285–288 serve to preset numbers in storage elements of the acceleration-deceleration control unit 300, which will now be described.

ACCELERATION-DECELERATION CONTROL UNIT

In order to insure a motor response step for each input pulse, pulse rates in excess of 100 pulses per second must be altered before being used to start and stop the motor, as previously stated. The acceleration-deceleration control unit 300 is provided to produce a pulse train that starts at a rate below 100 pulses/second and then increases in 1% steps to the final desired pulse rate. Also at the end of the cut, this control unit decreases the pulse rate in 1% steps to a rate below 100 pulses/second, at which point the motor can be instantaneously stopped. Thus, the motor is accelerated when it is started and decelerated before it is stopped in a manner that insures reliable operation.

The acceleration-deceleration control unit 300 (FIGS. 5, 12, 13, and 14) includes a two-decade pulse multiplier unit 310, 311 (FIG. 12) with two inputs: (1) a varying two-digit numeric quantity produced in a settable up-down counter 312, 313; and (2) a pulse train from a pulse generating system, shown at the left side of FIG. 12, controlled by $f_1$ pulses from the pulse divider 100. The output is a new pulse train which is the product of the pulse divider rate and the number in the up-down counter, which product is always less than 100 pulses per second in the starting setting of the up-down counter.

The pulse generating system which is the second input to the pulse multiplier unit 310, 311 includes a pulse doubler 150, which receives pulses at the rate of $f_0$ from OR-gate 68 of the pulse generating unit 7. The output 21 of unit 150 is fed to one input of AND-gate 151; these pulses have a repetition rate at least 20 times that of the highest possible rate of pulses $f_1$ at any time, for a reason to be described later. The other input to AND-gate 151 is from the set side of a flip-flop 152, the S input of which is fed by $f_1$ pulses from the pulse divider 100. The output of AND-gate 151 is fed to a divide-by-10 counter 153, the output of which is returned to the R input of flip-flop 152.

The circuit, as so far described, operates in the following manner: Assuming the flip-flop 152 to be in the reset condition, the next $f_1$ pulse will switch it to the set condition, producing a logical 1 state on its output and partially conditioning AND-gate 151. Ten $2f_0$ pulses will now pass to counter 153, which will issue an output pulse on receiving the tenth pulse and reset flip-flop 152. The same sequence occurs for each $f_1$ pulse.

Each group of ten $2f_0$ pulses passes line 154 to one input of an AND-gate 315, while each single pulse from counter 153 is fed by line 155 to one input of an AND-gate 316 at the rate $f_1$; thus the groups of ten pulses are sent to AND-gate 315 at the same rate per group as the single pulses to AND-gate 316. The AND-gates 315 and 316 are controlled by a 1 condition at the output of the reset side of a flip-flop 301, over line 156, when it is in the reset state.

THE UP-DOWN COUNTER

The up-down counter comprises a one's decade 312 and a ten's decade 313. These decades are similar binary-decimal counters, one of which will be described in detail later. Accordingly, each has a group of four outputs of weighted values 1, 2, 4, 8, as indicated, numbered 317 and 318, respectively, which extend to the pulse multiplier decades 310 and 311, respectively. Unit pulses are fed to decade 312 from OR-gate 323, in a manner to be described, and on counting ten such pulses decade 312 passes a carry pulse over line 157 to the input of decade 313.

The two decades 312 and 313 are coupled by groups of lines to the decision unit 200. While four input lines to each decade are shown in FIG. 12, since any desired 2-digit number could be set in the up-down counter, in the present example, as will be seen by referring to FIG. 11, only the one-bit line 286, the two-bit line 285, and the four-bit line 287 carry pulses to the tens decade 313, while the line 288 leading to the one-bit input of the ones decade is also connected to the lines 289 and 290 leading to the two-bit and four-bit inputs to the one's decade, respectively.

In the chosen example, the matrix shown in FIG. 11 will be set up by the feed rate set switches and the lead set switches in the manner previously described, to generate an output from AND-gate 281 on line 286, when switch 34 is de-energized. The output pulse on line 286 will set up a one in the ten's decade 313 of the up-down counter, while the direct output on line 288 will set up a binary 7 (1, 2, and 4 bits) in the one's decade 312 of the up-down counter. The structure and operation of the up-down counter will be described in detail later but for the present a more general description of the acceleration-deceleration unit 300 will be continued.

Both pulse multiplier decades 310 and 311 are so constructed, as will be described in detail presently, that their number of output pulses is controlled by the two binary numbers, herein referred to as $K_1$ and $K_2$, standing on the groups of lines 317 and 318, respectively, which connect the decades of the up-down counters to the corresponding pulse multiplier decades. From AND-gate 315 decade 311 receives ten pulses for each $f_1$ pulse issuing from the pulse divider 100. The 1 which was preset in the tens decade 313 causes the pulse multiplier decade 311 to issue pulses H in accordance with the equation:

$$H = K_2/10 \times 10f_1 = 1 \times 460 \text{ p.p.s.} = 460 \text{ p.p.s.}$$

The pulse multiplier decade 310, which receives from

AND-gate 316 one pulse for every $f_1$ pulse, issues pulses J in accordance with the equation:

$$J = K_1/10 \times f_1 = 7/10 \times 460 \text{ p.p.s.} = 322 \text{ p.p.s.}$$

These pulses from the two decades of the pulse multiplier are supplied, in different time phases, due to a delay unit 319, through OR-gate 320 to an accumulator decade 321. The pulses are accumulated at the rate of $$460 + 322 = 782 \text{ p.p.s.}$$

They are divided by ten in the accumulator so that the pulses issue from the accumulator 321 at the rate of 782/10=78.2 p.p.s.; this a rate of pulses which the stepping motor can handle without inaccuracy of response. Due to the reset state of flip-flop 301, whenever acceleration is called for since no setting pulse has issued on line 242 as described), a 1 condition on line 306 partially conditions AND-gate 304 and the pulses from accumulator 321 pass through AND-gate 304 and OR-gate 305 to the stepping motor unit S.

The pulse rate is to be accelerated in 1% steps; consequently, means are provided to increase the number in the up-down counter by 1 in response to the delivery of every four pulses from the accumulator 321. The same pulses which are passed through AND-gate 304 and OR-gate 305 to the stepping motor unit are delivered to a divide-by-four counter 322, which issues a pulse after every four pulses which it receives. The pulse from the divide-by-four counter passes through OR-gate 323 to the one's decade 312 of the up-down counter. Thus, after four pulses to the stepping motor unit the count in the ones decade 312 is increased from 7 to 8.

The pulse multiplier decade 310 now passes 8 pulses for each 10 pulses received from AND-gate 316. Thus, it delivers 368 pulses per second, which, when added to the 460 pulses per second from decade 311, make a total of 828 pulses per second. The pulse rate to the stepping motor is now 82.8 p.p.s. That is to say, the number of pulses per second has been changed by 82.8 minus 78.2 equals 4.6, or 1% or 460 p.p.s.

When the units decade 312 passes from 9 to 0 it transmits a carry pulse to the ten's decade 313 over line 157, changing the output from this decade to a binary 2.

The binary 9 outputs of line groups 317 and 318 are coupled by lines 324 and 325 to an AND-gate 326, which has a fifth input line 327a which supplies a logical 1 to AND-gate 326 whenever the up-down counter is set to count up. Thus, when the lines 324 and 325 both supply binary 9's to AND-gate 326 the AND-gate is enabled. At this time the stepping motor is moving at .99 of its final pulse rate. The next pulse from the pulse multiplier advances the up-down counter to zero, disabling AND-gate 326 and triggering a single shot multivibrator 327. A pulse from the single shot multivibrator 327 passes as a down-count signal through line 328 to both decades of the up-down counter, resetting them in a manner to be described presently, so that the pulses which they receive subsequently will cause them to count down instead of up. The same pulse from the multivibrator passes over line 329 to the S input of flip-flop 301, setting this flip-flop to the 1 state, with the result that AND-gates 315, 316, and 304 are disabled, while AND-gate 303 is enabled by the 1 condition on line 302. The stepping motor is now turning at a rate which permits it to receive pulses of frequency $f_1$, namely, 460 p.p.s., without missing. The operation continues until a signal is given, the source of which will be mentioned presently, indicating the end of the cut.

The end of the cut is signalled by the energization of switch 23 by the action of cam 31. Through normal machine controls, which are not shown or described, the table now drops and when it bottoms switch 19 is energized. When this occurs a pulse is fed through line 330 to the up-down counter (now in the zero position and set to count down), and the count changes to 99; that is to say, the multipliers $K_1$ and $K_2$ are now both 9's. Through a branch line 330a the same pulse resets flip-flop 301; AND-gate 303 is disabled and AND-gates 304, 315, and 316 are enabled. The high speed pulse train will be multiplied by .99 and its rate will decrease 1% for each four pulses delivered from the accumulator decade 321.

At the time the two digits were set in the ten's and units decades 312 and 313 of the up-down counter from the decision unit 200, the same digits were transmitted over groups of lines 331 and 332 to a storage register 333. This storage register now impresses outputs through groups of lines 334 and 335 on one pair of inputs to a coincidence detector 336, which has another pair of inputs connected by groups of lines 337 and 338 to corresponding groups of output lines 317 and 318, respectively, of the units decade 312 and ten's decade 313 of the up-down counter. When the count in the up-down counter is reduced to coincidence with the number, in this case 17, stored in the storage register 336, the coincidence is detected and an output is generated on a line 339 (FIG. 5) running to a helix cut stop matrix 340. This matrix 340 has been further conditioned by the end-of-cut signal on line 330 from switch 19, when energized, and receives a final input on line 342 from main counter 400. This counter 400 is a presettable down-counter the operation of which will be described in detail later; it will only be mentioned now that it steps down one unit in response to each pulse from either of the AND-gates 303 or 304, the pulses being passed through an OR-gate 342 to the input line 343 of the counter 400. When the counter steps to the next even number the three conditions of matrix 340 are satisfied and an output pulse is sent over line 344 to control unit 80, stopping the pulses $f_0$ issuing from the unit, thereby terminating one helix cutting operation.

DETAILED DESCRIPTION OF THE UP-DOWN COUNTER

The two decades 312, 313 of the up-down counter are binary-decimal counters, that is, they count in accordance with the binary progression 1, 2, 4, 8, the decimal value in each decade of the counter being equal to the sum of these weighted values, but each decade returns to zero at the tenth input pulse, the one's decade sending a carry pulse over line 157, on reaching zero, to the ten's decade.

Figure 13:
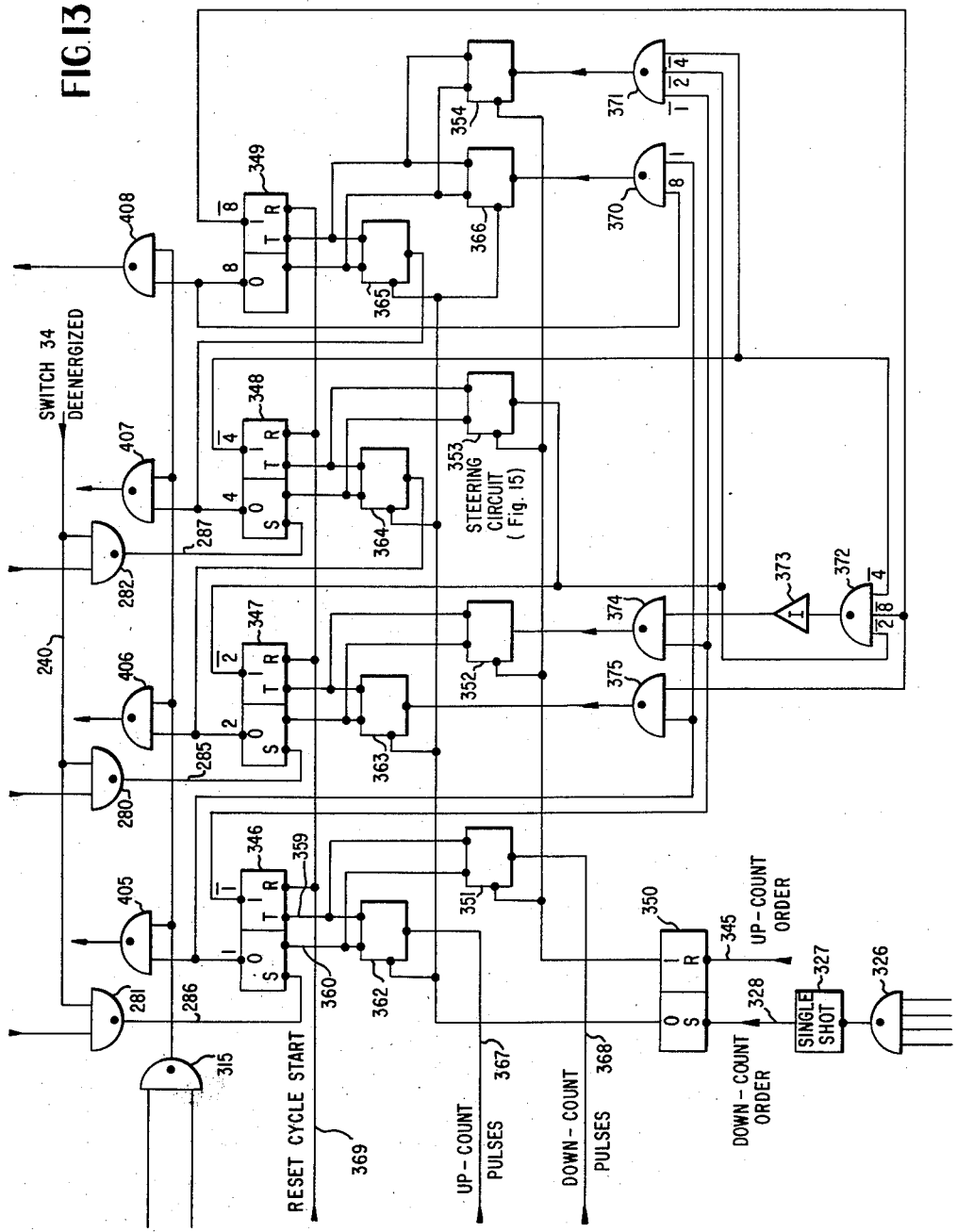
FIGURE 13 is a block diagram of the ten's decade of the up-down counter.

The structure of the ten's decade 313 of the up-down counter is shown in FIG. 13. As the name implies, this is a counter which can be set by a suitable input pulse, to count either up or down. The up-count pulse is delivered from switch 34 (FIG. 3) when it is energized, that is, when it is closed by cam 35. Line 345 (FIG. 12) delivers the pulse to the counter.

The counter comprises a group of four flip-flops 346, 347, 348 and 349, and interconnecting circuitry. Each flip-flop is set to represent a $\bar{1}$ (not one) when the right hand side has an output of one, and to represent a 1 (one) when the left hand side has an output of one. As shown in FIG. 13, all of the flip-flops stand in the $\bar{1}$ condition and as a whole the counter stands at zero.

Figure 15:
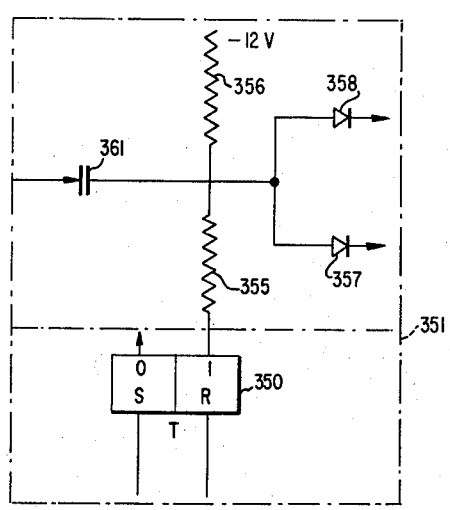
FIGURE 15 is a detail circuit view of a steering circuit used in connection with certain counters.

The condition of the counter, as to whether it will count up in response to input pulses, or down, is determined by a flip-flop 350, which receives the up-count signal pulse from line 345 at its reset input R. When the flip-flop 350 is reset the 1 condition on the output of its right side inhibits the steering circuits 351, 352, 353, and 354, in a manner which can be understood by referring to the detail view, FIG. 15. This view shows the right side output of flip-flop 350 connected to one end of a voltage divider 355, 356 (forming part of steering circuit 351, for example), the other end of which is connected to −12 volts. The junction of the voltage divider is coupled to the anodes of two diodes 357 and 358, the cathodes of which are connected, respectively, to inputs 359 and 360 of flip-flop 346, for example. When the flip-flop 350 is in the set state, ground potential ($\bar{1}$) at the bottom of the voltage divider places the junction at a positive potential which forward-biases that one of the diodes 357, 358 which is connected to the side of the flip-flop 346 which happens to be conducting, while the other diode is reversed-biased. A positive pulse through condenser 361 will pass through the forward-biased diode and switch the flip-flop 346. In the reset state of flip-flop 350, however, both ends of the voltage divider 355, 356 are negatively biased, both diodes 357, 358 are reverse-biased, and the steering circuit inhibits counting pulses applied to condenser 361.

When flip-flop 350 is in the set state steering circuits 362, 363, 364, 365, and 366 are similarly inhibited. The steering circuits 362, 363, and 364 are connected to form the T inputs, such as 359, 360, of flip-flops 346–348; while the outputs of steering circuits 365 and 366 are similarly connected, in parallel with the outputs of steering circuit 354, to form the T inputs of flip-flop 349. Up-count pulses are fed to steering circuit 362 over a line 367 from the 8 output of the 8-bit of the one's decade 312, while down-count pulses are fed to steering circuit 351 over a line 368 from the $\bar{8}$ output of the 8-bit of the one's decade. In FIG. 12 the lines 367 and 368 are represented by channel 157.

The one's decade 312 is similar to the ten's decade 313 (FIG. 13) except that counting pulses for both up and down counting are fed to it through OR-gate 323 (FIG. 12).

Considering the counting operation of the circuit of FIG. 13 in itself, and as standing for either the ten's decade or the one's decade, all of the flip-flops 346–349 will be assumed to be in the $\bar{1}$ state (the counter standing at zero as a result of a cycle start reset signal on line 369) and flip-flop 350 in the $\bar{1}$ state, to inhibit down-count pulses. Up-count pulses on line 367 will cause the bit positions to operate in that same sequence as that previously described for the pulse divider counter shown in FIG. 9, but the triggering of the 8-bit is different. The carry pulse from the set side of the 4-bit at the 8th pulse is now fed to the auxiliary T input of the 8-bit, to switch it to the set state. Another pulse to the auxiliary T input is delivered through steering circuit 366 from AND-gate 370, on the one-to-zero transition of the latter caused by the switch of the 1-bit, in response to the 10th pulse, to switch the 8-bit to zero.

When the flip-flops 350 or both decades are in the set state steering circuits 362-366 are inhibited and the counter responds to down count pulses. Assuming that all of the bits of both decades are in the zero state and that the AND-gate 371 therefore have a 1 output, the first pulse through OR-gate 323 (FIG. 12) will pass through steering circuit 350 of the one's decade and change flip-flop 346 to the one state, disabling AND-gate 371. The transition pulse from AND-gate 371 passes through steering circuit 354 to trigger flip-flop 349 to the one state, generating a carry pulse over line 368 to trigger the 1-bit of the ten's decade to the one state. The 8-bit of the ten's decade then responds in the manner previously described for the one's decade and the counter stands at binary 99.

The second pulse to the one's counter changes flip-flop 346 to the zero state, and a binary 8 is in the counter. AND-gate 371 is enabled, AND-gate 372 is disabled by the zero on the $\bar{8}$ input and its output, inverted by 373, plus the one input from reset side of flip-flop 346, enables AND-gate 374.

The third pulse toggles flip-flop 346 to the one state, which disables AND-gates 374 and 371. The transition pulse from AND-gate 371 flips flip-flop 349 to the zero state, and the transition pulse from AND-gate 374 triggers flip-flop 347 to the one state. The carry pulse from the reset side of flip-flop 347 toggles flip-flop 348 to the one state. A binary 7 is now in the decade. The zero output from the right side of flip-flop 347 maintains AND-gate 374 partially enabled.

The fourth pulse changes flip-flop 346 to the zero state, which, in turn, enables AND-gate 374. The readout from the decade shows a binary 6.

The fifth pulse toggles flip-flop 346 to the one state, which disables AND-gate 374. The transition pulse from the gate flips flip-flop 347 to the zero state and a binary 5 is in the decade.

The sixth pulse triggers flip-flop 346 to the zero state and AND-gate 374 is enabled. The readout of the decade shows a binary 4.

The seventh pulse toggles flip-flop 346 to the one state, which disables AND-gate 374. The transition pulse from the gate triggers flip-flop 347 to the one state and the carry pulse from its reset side flips flip-flop 348 to the zero state. A binary 3 is now in the decade.

The eighth pulse toggles flip-flop 346 to the zero state, which enables AND-gate 374. A binary 2 is in the decade.

The ninth pulse triggers flip-flop 346 to the one state, which disables AND-gate 374. The transition pulse toggles flip-flop 347 to the zero state. AND-gate 372 is now enabled and, through inverter 373, provides a second inhibiting input to AND-gate 374. The readout of the decade shows a binary 1.

The tenth pulse triggers flip-flop 346 to the zero state and all of the flip-flops are in the reset or zero state and the readout is a zero. The sequence will repeat for every ten input pulses. The first one of the next ten pulses will change the one's counter to a binary 9 and the one-to-zero transition at the $\bar{8}$ output of the 9-bit of the one's decade will pass through line 368 to the auxiliary T input of flip-flop 346 of the ten's decade. It will be remembered that this decade stood at binary 9; flip-flop 346 will therefore flip from the one to the zero state, leaving a binary 8 in the ten's decade. The downcounting of this decade thus proceeds in the same manner as the one's decade, in response to every change from 0 to 9 of the one's decade.

OPERATION OF THE PULSE MULTIPLIER OF THE ACCELERATION-DECELERATION CONTROL UNIT

The operation of the pulse multiplier will be described by reference to FIGURE 14, which shows the ten's decade of that multiplier. The operation of the one's decade of the pulse multiplier is quite similar, except that pulses are supplied to it at one-tenth the rate at which pulses are supplied to the ten's decade.

It will be remembered that the function of the pulse multiplier is to pass to the stepping motor unit S a number of pulses per second which is derived by multiplying the pulses at frequency $f_1$ by a fact or initially determined by the setting of the up-down counter 312, 313 derived from the decision unit 200; further, that the number of pulses delivered by the pulse multiplier decades will be increased one percent at every fourth pulse, due to the fact that the up-down counter is being advanced by one unit for each said fourth pulse. The description of the pulse multiplier unit will show how, under the control of the up-down counter, the ten's decade of the pulse multiplier unit is made to pass an increasing number of the ten pulses of frequency $2f_0$ fed to it through AND-gate 315 at each $f_1$ time, as the count in the ten's decade of the up-down counter increases. The same thing is occurring in the one's decade 310 of the pulse multiplier, under the control of the unit's counter 312 of the up-down counter. The description of the ten's decade 311 of the pulse multiplier will explain the operation of this circuit under each of the ten conditions in which it is placed by the ten different input conditions it receives from the ten's decade of the up-down counter. For a clearer understanding of the operation, the description is illuminated by truth tables, there being a different truth table for each setting of the ten's decade of the up-down counter.

A "cycle start" signal, which occurs at the beginning of each helix generation operation, is fed to the reset input R of each of the four flip-flops, 401, 402, 403 and 404, over line 369. The same signal passes to the decades of the up-down counter, preceding the presetting of these decades by the decision unit, which occurs when an acceleration procedure is to take place. The multiplier decade 311 is thereby placed in the condition shown in truth table II for input pulse 0. A signal issued on line 345 (FIG. 12) when switch 34 is energized resets flip-flop 301 causing AND-gates 304, 315 and 316 to be partially enabled.

When the ten's decade 313 of the up-down counter is preset to a binary 1 by the decision unit 200, only the 1 bit of that decade has a 1 output and this output partially enables AND-gate 405. Thereby, groups of ten pulses of $2f_0$ frequency can be fed through AND-gate 315 and AND-gate 405 to the T input of flip-flop 401. The first of these pulses changes the flip-flop to the one state and the outputs of the flip-flops of this decade of the multiplier are now as shown for pulse 1 in truth table II.

The second input pulse moves through the gates and triggers flip-flop 401 to the zero state. The 1 to zero transition pulse from the 1 side (right side) of this flip-flop is fed through a 6 mic./sec. delay to the T input of flip-flop 402 and it is flipped to the 1 state. The state of the multiplier flip-flops is as shown for pulse 2 of truth table II.

*Truth table II*

Truth Table for a setting of 1 in Up-Down Counter 10's Decade; "And" Gate 405 enabled.

| Input Pulse No. | 1 | 2 | 4 | 8 | Output Pulses |
|---|---|---|---|---|---|
| 0 | 10 | 10 | 10 | 10 | |
| 1 | 01 | 10 | 10 | 10 | |
| 2 | 10 | 01 | | | |
| 3 | 01 | 01 | 10 | 10 | |
| 4 | 10 | 10 | | | |
| | | | 01 | | |
| 5 | 10 | 10 | 01 | 10 | |
| 6 | 01 | 10 | 01 | | |
| | 10 | 01 | | | |
| 7 | 10 | 01 | 01 | 10 | |
| 8 | 01 | 01 | | | |
| | 10 | 10 | | | |
| | | | 10 | 01 | |
| | | 01 | 01 | | |
| 9 | 10 | 01 | 01 | 01 | |
| 10 | 01 | 01 | | | |
| | 10 | 10 | | | |
| | | | 10 | 10 | |
| | 10 | 10 | 10 | 10 | 1 → |

The third input pulse to the T input of flip-flop 401 changes it to the 1 state. The read out of the multiplier is as shown for pulse 3 of truth table II.

Input pulse 4 triggers flip-flop 401 to the zero state. The 1 to zero transition pulse is delayed for 6 mic./sec. and then fed to the T input of flip-flop 402. Flip-flop 402 changes from the 1 state to the zero state. The 1 to zero transition pulse from its 1 side is fed through a 3 mic./sec. delay to the T input of flip-flop 403. The delayed pulse changes flip-flop 403 to the 1 state. The read out of the multiplier flip-flops is as shown for pulse 4 of the truth table.

The fifth input pulse triggers flip-flop 401 to the 1 state. The state of the flip-flops is as shown for pulse 5 in the truth table.

The sixth input pulse flips flip-flop 401 to the zero state and the 1 to zero transition pulse, after being delayed, triggers flip-flop 402 to the 1 state and the read out from the flip-flops is as shown for pulse 6.

The seventh input pulse triggers flip-flop 401 to the 1 state and the read out of the decade is as shown for pulse 7.

The eighth input pulse triggers flip-flop 401 to the zero state, the transition pulse from the 1 side is fed through the 6 mic./sec. delay to flip-flop 402, and it flips to the zero state; the transition pulse from the 1 side of this flip-flop is fed through the 3 mic./sec. delay to flip-flop 403 and triggers it to the zero state. The carry pulse from the 1 side of flip-flop 403 is fed to the T input of flip-flop 404 and it changes to the 1 state. The 1 to zero transition pulse from the reset side of this flip-flop is fed back through a 12 mic./sec. delay and a steering circuit 415 to the flip-flop 403, changing it to the 1 state in the manner previously stated in the detailed description of a steering circuit. The same pulse is delayed another 3 mic./sec. by delay 412 and then fed through a steering circuit 413 to flip-flop 402, triggering it to the 1 state. The states of the flip-flops after the eighth pulse are as shown in truth table II.

The ninth pulse triggers flip-flop 401 to the 1 state. All the flip-flops are now in the 1 state as shown in truth table II for pulse 9.

The tenth pulse flips flip-flop 401 to the zero state. Its carry pulse is delayed and fed to flip-flop 402, which changes to the zero state; the flip-flop 402's 1-to-zero transition pulse is delayed and fed to flip-flop 403, and it changes to the zero state; flip-flop 403's 1-to-zero transition pulse is fed to flip-flop 404 and it flips to the zero state. The 1-to-zero transition pulse of flip-flop 404 is taken as an output pulse and fed to OR-gate 320 (see also FIGURE 12). The multiplier has produced one output pulse for ten input pulses, thereby multiplying the pulse train by $K_2/10$ or 1/10.

When a binary 2 is in the up-down counter, only the 2 bit has a 1 output and AND-gate 406 is enabled. Pulses from AND-gate 315 move through it to steering circuit 414, which will trigger flip-flop 402 in a manner similar to pulses on its T input.

The first input pulse that triggers flip-flop 402 changes it to the 1 state. The condition of the flip-flops is shown in truth table III.

The second input pulse returns flip-flop 402 to the zero state and the 1 to zero transition pulse is delayed in circuit 410 for 3 mic./sec. and then fed to the T input of flip-flop 403, which changes to the 1 state. The states of the flip-flops are as shown in the truth table for pulse 2.

*Truth table III*

Truth Table for a setting of 2; AND Gate 406 enabled.

| | 1 | 2 | 4 | 8 | Output Pulses |
|---|---|---|---|---|---|
| 0 | 10 | 10 | 10 | 10 | |
| 1 | 10 | 01 | 10 | 10 | |
| 2 | | 10 | | | |
| | | 01 | | | |
| 3 | 10 | 10 | 01 | 10 | |
| 4 | 10 | 01 | | | |
| | | 10 | | | |
| | | | 10 | 01 | |
| | | | 10 | | |
| | | 01 | | | |
| 5 | 10 | 01 | 01 | 01 | |
| | | 10 | | | |
| | | | 10 | | |
| | | | | 10 | 1 → |
| | 10 | 10 | 10 | 10 | |

Pulses 6 to 10 repeat the sequence

| 6 | 10 | 01 | 10 | 10 | |
| 7 | 10 | 10 | 01 | 10 | |
| 8 | 10 | 01 | | 10 | |
| 9 | 10 | 01 | 01 | 01 | |
| 10 | 10 | 10 | 10 | 10 | 2 → |

The third input pulse triggers flip-flop 402 to the 1 state and the condition of the multiplier decade is shown in the truth table.

The fourth pulse changes flip-flop 402 to the zero state.

Its carry pulse is delayed 3 mic./sec. and then fed to flip-flop 403, which changes to the zero state. The 1 to zero transition pulse of flip-flop 403 is fed to the T input of flip-flop 404 and it changes to the 1 state. The 1 to zero transition pulse from the reset side of the flip-flop is delayed 12 mic./sec. and then fed through steering circuit 415 to flip-flop 403, changing it to the 1 state. This signal is delayed an additional 3 mic./sec. and then fed to the steering circuit 413 of flip-flop 402, flipping it to the 1 state. The state of all flip-flops of the decade is as shown for pulse 4 in the truth table.

The fifth pulse changes flip-flop 402 to the zero state. Its transition pulse is delayed and fed to flip-flop 403 and it changes to the zero state. The transition pulse from flip-flop 403 changes flip-flop 404 to the zero state and an output pulse is generated to OR-gate 320. The same sequence will repeat for the next five pulses, therefore, two output pulses are generated for ten input pulses, or the pulse train is multiplied $K_2/10$ or 2/10.

When a binary 3 is in the up-down counter, the 1 and 2 bits have a 1 output and the AND-gates 405 and 406 are primed, allowing pulses to move through them.

The first pulse triggers flip-flops 401 and 402 to the 1 state. The state of all the flip-flops at this time is shown in the truth table IV.

The second pulse changes flip-flops 401 and 402 to the zero state. The transition pulse from flip-flop 402 is delayed 3 mic./sec. and fed to the T input of flip-flop 403 and it changes to the 1 state. The transition pulse from flip-flop 401 is delayed 6 mic./sec. and then fed to the T input of flip-flop 402, changing it to the 1 state. The read out from all the flip-flops for pulse 2 is shown in the truth table.

The third pulse triggers flip-flop 401 to the 1 state and flip-flop 402 to the zero state. The delayed pulse from flip-flop 402 triggers flip-flop 403 to the zero state. The output pulse from flip-flop 403 is fed to the T input of flip-flop 404 and it changes to the 1 state. The 1 to zero transition pulse from the reset side of flip-flop 404 is fed through a 12 mic./sec. delay 411 and then triggers flip-flop 403 to the 1 state. The same pulse delayed 3 mic./sec. longer in 412 triggers flip-flop 402 and it changes to the 1 state. At this time, all flip-flops are in the 1 state (refer to truth table IV).

The fourth pulse triggers flip-flops 401, and 402 to the zero state. The delayed transition pulse from flip-flop 402 flips flip-flop 403 to the zero state, and its carry pulse changes flip-flop 404 to the zero state. The first output pulse is generated from the one side of flip-flop 404 and fed to OR-gate 320. The transition pulse from flip-flop 401, which had been delayed 6 mic./sec., now triggers flip-flop 402 to the one state. The state of the flip-flops in the pulse multiplier is shown in the truth table.

The fifth pulse triggers flip-flop 401 to the one state and flip-flop 402 to the zero state. The transition pulse from flip-flop 402, delayed 3 mic./sec., is fed to flip-flop 403, triggering it to the one state. The state of the flip-flops for pulse number 5 is shown in the truth table.

The sixth pulse changes flip-flop 401 to the zero state, and flip-flop 402 to the one state. The delayed transition pulse from flip-flop 401 triggers flip-flop 402 to the zero state. The pulse from flip-flop 402 is delayed and fed to flip-flop 403 and it changes to the zero state. Its one to zero pulse is fed to flip-flop 404 and it changes to the one state. The transition pulse from the reset side of flip-flop 404 is delayed and then used to trigger flip-flop 403, which changes to the one state. The same pulse delayed an additional 3 mic./sec. is fed to flip-flop 402, and it flips to the one condition. The condition of all flip-flops for pulse #6 is shown in the truth table.

The seventh input pulse triggers flip-flop 401 to the one state and flip-flop 402 to the zero state. The transition pulse from flip-flop 402 is delayed and fed to flip-flop 403, which flips to the zero state. The carry from flip-flop 403 triggers flip-flop 404 to the zero state, generating the second output pulse to OR-gate 320. The truth table shows the condition of all flip-flops for the seventh pulse.

The eighth input pulse flips flip-flop 401 to the zero state and flip-flop 402 to the 1 state. The output pulse from flip-flop 401 is delayed and then triggers flip-flop 402 to the zero state. The pulse generated when flip-flop 402 changed to the zero state is delayed and then used to trigger flip-flop 403 to the 1 state. The condition of the pulse multiplier for the eighth pulse is shown in the truth table.

The ninth pulse triggers flip-flops 401 and 402 to the 1 state, and since no internal pulses are generated, the condition of the flip-flops is as shown in the truth table for the ninth pulse.

The tenth pulse flips flip-flops 401 and 402 to the zero state and each flip-flip generates an output pulse. The output pulse from flip-flop 402 is delayed 3 mic./sec. and then triggers flip-flop 403 to the zero state. Its carry pulse immediately triggers flip-flop 404 to the 1 state. The transition pulse from flip-flop 401 is delayed 6 mic./sec. and then triggers flip-flop 402 to the 1 state. When flip-flop 404 changed to the 1 state, a pulse was generated from its reset side and delayed 12 mic./sec. It then triggers flip-flop 403 to the 1 state. The same pulse, delayed 3 mic./sec. longer, triggers flip-flop 402 to the zero state. The delayed transition pulse from flip-flop 402 triggers flip-flop 403 to the zero state, and the pulse from flip-flop 403, changing state, triggers flip-flop 404 to the zero state, generating the third output pulse. All flip-flops are now in the zero state and the pulse multiplier has multiplied the pulse train by $K_2/10$ or 3/10; i.e., for each ten input pulses three output pulses have been generated.

When a binary 4 is in the up-down counter, AND-gate 407 is primed to allow pulses to move through it.

The first input pulse triggers flip-flop 403 to the 1 state and the condition of all the flip-flops is shown in Truth Table V.

The second pulse changes flip-flop 403 to the zero state and its transition pulse flips flip-flop 404 to the 1 state.

*Truth Table IV*

Truth Table for 3—AND Gates 405 and 406 enabled.

| | 1 | 2 | 4 | 8 | Output Pulses |
|---|---|---|---|---|---|
| 0 | 10 | 10 | 10 | 10 | |
| 1 | 01 | 01 | 10 | 10 | |
| 2 | 10 | 10 | | | |
| | | | 01 | | |
| | | 01 | | | |
| 3 | 10 | 01 | 01 | 10 | |
| | 01 | 10 | | | |
| | | | 10 | 01 | |
| | | | 01 | | |
| | | 01 | | | |
| 4 | 01 | 01 | 01 | 01 | |
| | 10 | 10 | | | |
| | | | 10 | 10 | 1 → |
| | | 01 | | | |
| 5 | 10 | 01 | 10 | 10 | |
| | 01 | 10 | | | |
| | | | 01 | | |
| 6 | 01 | 10 | 01 | 10 | |
| | 10 | 01 | | | |
| | | 10 | | | |
| | | | 10 | 01 | |
| | | 01 | | | |
| 7 | 10 | 01 | 01 | 01 | |
| | 01 | 10 | | | |
| | | | 10 | 10 | 2 → |
| 8 | 01 | 10 | 10 | 10 | |
| | 10 | 01 | | | |
| | | 10 | | | |
| | 10 | 10 | | | |
| | | | 01 | | |
| 9 | 10 | 10 | 10 | 01 | 10 |
| 10 | 10 | 10 | | | |
| | | | 10 | 01 | |
| | | 01 | | | |
| | | | 01 | | |
| | | 10 | | | |
| | | | 10 | 10 | 3 → |
| | 10 | 10 | 10 | 10 | |

The delayed output pulse from the reset side of flip-flop 404 first triggers flip-flop 403 to the 1 state and then flip-flop 402 to the 1 state. The state of all of the flip-flops for the second pulse is shown in Truth Table V.

*Truth Table V*

Truth Table for Setting of 4 in UDC and Gate 407 Enabled.

|   | 1 | 2 | 4 | 8 | Output Pulses |
|---|---|---|---|---|---|
| 0 | 10 | 10 | 10 | 10 | |
| 1 | 10 | 10 | 01 | 10 | |
| 2 | 10 | 10 | 10 | 01 | |
|   |   | 01 | 01 |   | |
| 3 | 10 | 01 | 01 | 01 | 1 → |
|   |   |   | 10 | 10 | |
| 4 | 10 | 01 | 10 | 10 | |
| 5 | 10 | 01 | 01 | 10 | |
|   |   |   | 10 | 01 | |
|   |   | 10 |   |   | |
|   |   |   | 10 | 10 | 2 → |
|   | 10 | 10 | 10 | 10 | |
| Pulses 6 to 10 repeat the sequence | | | | | |
| 6 | 10 | 10 | 01 | 10 | |
| 7 | 10 | 01 | 01 | 01 | |
| 8 | 10 | 01 | 01 | 10 | 3 → |
| 9 | 10 | 01 | 01 | 10 | |
| 10 | 10 | 01 | 10 | 01 | |
|   | 10 | 10 | 10 | 10 | 4 → |

The third pulse changes flip-flop 403 to the zero state. Its transition pulse triggers flip-flop 404 to the zero state, and the first output pulse is generated from the set side of flip-flop 404 and fed to OR-gate 320. Refer to Truth Table V for the condition of all flip-flops after the third input pulse.

The fourth pulse triggers flip-flop 403 to the 1 state. The flip-flop outputs are shown as for pulse 4.

The fifth pulse flips flip-flop 403 to the zero state. Its carry pulse triggers flip-flop 404 to the 1 state, and the transition pulse from the reset side of flip-flop 404, after a delay of 12 mic./sec. triggers flip-flop 403 to the 1 state. The same pulse, delayed 3 mic./sec. longer, triggers flip-flop 402 to the zero state. Its carry pulse flips flip-flop 403 to the zero state and the output changes flip-flip 404 to the zero state, generating a second output pulse. All flip-flops are now in the zero state. The same sequence will repeat for the next five pulses. Thus, four output pulses are generated for ten input pulses; i.e., the incoming pulse train is multiplied by $K_2/10$ or 4/10.

When a binary 5 is in the up-down counter, the 1 and 4 bits have a 1 output and AND-gates 405 and 407 are partially enabled, allowing any pulses present on the remaining leg to move through to trigger the corresponding flip-flop. With a 5 in the up-down counter, the incoming pulse train will be multiplied by $K_2/10$ or 5/10.

The first pulse triggers flip-flops 401 and 403 to the 1 state. (See Truth Table VI for states of all flip-flops after the first pulse.)

The second pulse changes flip-flops 401 and 403 to the zero state. The transition pulse from flip-flop 403 immediately triggers flip-flop 404 to the 1 state. The carry pulse from flip-flop 401 is delayed 6 mic./sec. and then fed to flip-flop 402 to trigger it to the 1 state. When flip-flop 404 changed to the 1 state, a pulse was generated from its reset side and fed to a 12 mic./sec. delay 411. The delayed pulse triggers flip-flop 403 to the 1 state and the same pulse, delayed 3 mic./sec. longer, flips flip-flop 402 back to the zero state. The delayed transition pulse from flip-flop 402 changes flip-flop 403 to the zero state and its carry pulse flips flip-flop 404 back to the zero state, generating an output pulse which is fed to OR-gate 320.

The flip-flops are now in the zero state and the same sequence will be repeated for every two pulses. The multiplier, therefore, will multiply the incoming pulse train by $K_2/10$ or 5/10.

*Truth Table VI*

Truth Table for Setting of 5 AND-Gates 405 and 407 Enabled.

|   | 1 | 2 | 4 | 8 | Output Pulses |
|---|---|---|---|---|---|
| 0 | 10 | 10 | 10 | 10 | |
| 1 | 01 | 10 | 01 | 10 | |
| 2 | 10 |    | 10 | 01 | |
|   |    | 01 |    |    | |
|   |    | 10 | 01 |    | |
|   |    |    | 10 | 10 | 1 → |
|   | 10 | 10 | 10 | 10 | |
| Pulses 3 to 10 repeat four sequences as above | | | | | |
| 3 | 01 | 10 | 01 | 10 | |
| 4 | 10 |    | 10 | 01 | |
|   | 10 | 10 | 10 | 10 | 2 → |

When a binary 6 is in the up-down counter, the 2 and 4 bits have a 1 output and AND-gates 406 and 407 are primed, allowing any pulse present on the remaining leg to move through to trigger the corresponding flip-flop.

With a 6 in the up-down counter, the incoming pulse train will be multiplied by $K_2/10$ or 6/10.

The first pulse triggers flip-flop 402 and 403 to the 1 state. (See Truth Table VII for the condition of all flip-flops after each input pulse.)

The second pulse flips flip-flops 402 and 403 to the zero state. The carry pulse from flip-flop 403 immediately triggers flip-flop 404 to the 1 state. The pulse from flip-flop 402 after a delay of 3 mic./sec. triggers flip-flop 403 to the 1 state. When flip-flop 404 changed to the 1 state, a pulse was generated from the reset side and delayed 12 mic./sec. in 411. After this delay, it triggers flip-flop 403 to the zero state. The carry pulse from flip-flop 403 immediately triggers flip-flop 404 to the zero state, generating an output which is fed to OR-gate 320. The same pulse that triggered flip-flop 403 is delayed an additional 3 mic./sec. and then triggers flip-flop 402 to the 1 state (refer to Truth Table VII for the condition of all flip-flops after the second pulse).

*Truth Table VII*

Truth Table for Setting of 6 in UDC and Gates 406 and 407 Enabled.

|   | 1 | 2 | 4 | 8 | Output Pulses |
|---|---|---|---|---|---|
| 0 | 10 | 10 | 10 | 10 | |
| 1 | 10 | 01 | 01 | 10 | |
| 2 |    | 10 | 10 | 01 | |
|   |    |    | 01 |    | |
|   |    |    | 10 | 10 | 1 → |
|   |    | 01 |    |    | |
|   | 10 | 01 | 10 | 10 | |
| 3 |    | 10 | 01 | 01 | |
|   |    |    | 10 |    | |
|   |    |    | 01 |    | |
|   |    | 01 |    |    | |
| 4 | 10 | 01 | 01 | 01 | 2 → |
|   |    | 10 | 10 | 10 | |
|   |    |    | 01 |    | |
| 5 | 10 | 10 | 01 | 10 | |
|   |    | 01 | 10 | 01 | |
|   |    |    | 01 |    | |
|   |    | 10 |    |    | |
|   |    |    | 10 | 10 | 3 → |
|   | 10 | 10 | 10 | 10 | |

Pulses 6 to 10 repeat the sequence.

The third pulse triggers flip-flop 402 to the zero state and flip-flop 403 to the 1 state. The delayed transition pulse from flip-flop 402 flips flip-flop 403 back to the zero state. The transition pulse from flip-flop 403 triggers flip-flop 404 to the 1 state, and from flip-flop 404 a pulse is generated from the reset side and fed to the 12 mic./sec. delay 411. This delayed pulse triggers flip-flop 403 to the 1 state, and after being delayed another 3 mic./sec., triggers flip-flop 402 to the 1 state. (See truth table for condition of all flip-flops after the third pulse.)

The fourth pulse changes flip-flops 402 and 403 to the zero state. The pulse from flip-flop 403 immediately triggers flip-flop 404 to the zero state, generating the second output pulse of the multiplier. The delayed transition pulse from flip-flop 402 changes flip-flop 403 to the 1 state. (See truth table for condition of all flip-flops after the fourth pulse.)

The fifth input pulse changes flip-flop 402 to the 1 state and flip-flop 403 to the zero state. The pulse from flip-flop 403 triggers flip-flop 404 to the 1 state. The output pulse from the reset side of flip-flop 404 is delayed 12 mic./sec. and then triggers flip-flop 403 to the 1 state. The same pulse, delayed 3 mic./sec. longer, triggers flip-flop 402 to the zero state. The delayed carry pulse from flip-flop 402 flips flip-flop 403 to the zero state and flip-flop 403's carry pulse triggers flip-flop 404 to the zero state, generating the third output pulse. All flip-flops now are in the zero state, and that the sequence will be repeated for the next five pulses. Therefore, the pulse train is multiplied by $K_2/10$ or 6/10.

When a binary 7 is in the up-down counter, the 1, 2 and 4 bits have a 1 output and AND-gates 405, 406 and 407 are partially enabled, allowing pulses present on the remaining leg to move through to trigger the corresponding flip-flops. With a 7 in the up-down counter, the incoming pulse train will be multiplied by $K_2/10$ or 7/10.

The first pulse triggers flip-flops 401, 402 and 403 to the 1 state. (See Truth Table VIII for conditions of all flip-flops after each pulse.)

The second pulse flips flip-flops 401, 402 and 403 to the zero state. The transition pulse from flip-flop 403 immediately triggers flip-flop 404 to the 1 state. The delayed carry pulse from flip-flop 402 triggers flip-flop 403 to the 1 state and the pulse from flip-flop 401, which is delayed longer, changes flip-flop 402 to the 1 state. When flip-flop 404 changed to the 1 state, a transition pulse was generated from the reset side of the flip-flop and delayed for 12 mic./sec., which allows all the carries generated by flip-flops 401, 402 and 403 to propagate through the multiplier. The delayed pulse triggers flip-flop 403 to the zero state and the transition pulse from flip-flop 403 triggers flip-flop 404 to the zero state, generating an output pulse which is fed to OR-gate 320. The same pulse that was delayed for 12 mic./sec. is delayed another 3 mic./sec. and is used to trigger flip-flop 402 to the zero state. The transition pulse from flip-flop 402 flips flip-flop 403 to the 1 state and the condition of the flip-flops is as shown for pulse #2 in Truth Table VIII.

The third input pulse changes flip-flops 401 and 402 to the 1 state and flip-flop 403 to the zero state. The carry pulse from flip-flop 403 triggers flip-flop 404 to the 1 state. The delayed pulse from the reset side of flip-flop 404 flips the flip-flop 403 to the 1 state and 3 mic./sec. later changes flip-flop 402 to the zero condition. The pulse from flip-flop 402 flips the flip-flop 403 to the zero state and the change of state pulse from flip-flop 403 puts flip-flop 404 in the zero state. An output pulse is generated by this transition and fed to OR-gate 320. (See truth table for conditions or flip-flops after the third pulse.)

The fourth input pulse changes flip-flops 402 and 403 to the 1 state and flip-flop 401 to the zero state. The delayed carry pulse from flip-flop 401 triggers flip-flop 402 to the zero state and the delayed pulse from flip-flop 402 changes flip-flop 403 to the zero state. Flip-flop 403's pulse changes flip-flop 404 to the 1 state and a feedback pulse is generated from flip-flop 404 which is delayed and then fed to flip-flop 403 to flip it to the 1 state. The feed-back pulse is delayed an additional 3 mic./sec. and then fed to flip-flop 402 to change it to the 1 state. (The condition of the multiplier is shown in the truth table.)

The fifth pulse changes flip-flop 401 to the 1 state and flip-flops 402 and 403 to the zero state. The carry pulse from flip-flop 403 flips flip-flop 404 to the zero state and the third output pulse is generated. The delayed carry pulse from flip-flop 402 changes flip-flop 403 to the 1 state. (The truth table shows the condition of the flip-flops.)

The sixth pulse triggers flip-flops 401 and 403 to the zero condition and flip-flop 402 to the 1 state. The transition pulse from flip-flops 403 triggers flip-flop 404 to the 1 state, generating a feedback pulse. The pulse from flip-flop 401 flips flip-flop 402 to the zero state, generating a carry pulse which triggers flip-flop 403 to the 1 state. The delayed feedback pulse from flip-flop 404 now flips flip-flop 403 to the zero state generating a carry pulse which immediately triggers flip-flop 404 to the zero state, generating a fourth output pulse. The same delayed feedback pulse delayed 3 mic./sec. longer, triggers flip-flop 402 to the 1 state. (The truth table shows states of the flip-flops.)

The seventh input pulse triggers flip-flops 401 and 403 to the 1 state and flip-flop 402 to the zero state. The transition pulse from flip-flop 402 changes flip-flop 403 to the zero state and the carry pulse from flip-flop 403 immediately changes the state of flip-flop 404 to the 1 state. The transition pulse on the reset side of flip-flop

*Truth Table VIII*

Truth Table for Setting of 7 in UDC—And Gates 405, 406, 407 enabled.

| | 1 | 2 | 4 | 8 | Output Pulses |
|---|---|---|---|---|---|
| 0 | 10 | 10 | 10 | 10 | |
| 1 | 01 | 01 | 01 | 10 | |
| 2 | 10 | 10 | 10 | 01 | |
| | | | 01 | | |
| | | | 10 | 10 | 1 → |
| | | 10 | | | |
| 3 | 10 | 10 | 01 | 10 | |
| | 01 | 01 | 10 | 01 | |
| | | | 01 | | |
| | | | 10 | 10 | 2 → |
| | 01 | 10 | 10 | 10 | |
| 4 | 10 | 01 | 01 | | |
| | | 10 | | | |
| | | | 10 | 01 | |
| | | | 01 | | |
| | | 01 | | | |
| | 10 | 01 | 01 | 01 | |
| 5 | 01 | 10 | 10 | 10 | 3 → |
| | | | 01 | | |
| | 01 | 10 | 01 | 10 | |
| 6 | 10 | 01 | 10 | 01 | |
| | | 10 | 01 | | |
| | | | 10 | 10 | 4 → |
| | | 01 | | | |
| 7 | 10 | 01 | 01 | 10 | |
| | 01 | 10 | 01 | | |
| | | | 10 | 01 | |
| | | | 01 | | |
| | | 01 | | | |
| 8 | 01 | 01 | 01 | 01 | |
| | 10 | 10 | 10 | 10 | 5 → |
| | | | 01 | | |
| | | 01 | | | |
| | 10 | 01 | 01 | 10 | |
| 9 | 01 | 10 | 10 | 01 | |
| | | | 01 | | |
| | | | 10 | 10 | 6 → |
| | | 01 | | | |
| | 01 | 01 | 10 | 10 | |
| 10 | 10 | 10 | 01 | 01 | |
| | | | 10 | | |
| | | | 01 | | |
| | | 01 | | | |
| | | 10 | | | |
| | | | 10 | 10 | 7 → |
| | 10 | 10 | 10 | 10 | |

404 is delayed 12 mic./sec. and then fed to flip-flop 403 to change it to the 1 state. This same transition pulse additionally delayed triggers flip-flop 402 to the 1 state. (The state of the flip-flops is shown in the truth table.)

The eighth input pulse changes flip-flops 401, 402 and 403 to the zero state. The transition pulse from flip-flop 403 triggers flip-flop 404 to the zero state and the fifth output pulse is generated. The transition pulse from flip-flop 402 flips flip-flop 403 to the 1 condition and the delayed pulse from flip-flop 401 changes flip-flop 402 to the 1 state. (The states of the flip-flops are shown in the truth table.)

The ninth input pulse changes flip-flop 402 and flip-flop 403 to the zero state and flips flip-flop 401 to the 1 state. The carry pulse from flip-flop 403 triggers flip-flop 404 to the 1 state generating feedback transition pulse. The carry pulse from flip-flop 402 flips flip-flop 403 to the 1 state. The feedback pulse from flip-flop 404, after the first delay triggers flip-flop 403 to the zero state and transition pulse from flip-flop 403 triggers flip-flop 404 to the zero state, generating the sixth output pulse. The feedback pulse, delayed an additional 3 mic./sec., now triggers flip-flop 402 to the 1 state. (See truth table for condition of flip-flops.)

The tenth input pulse triggers flip-flops 401 and 402 to the zero state and flip-flop 403 to the 1 state. The transition pulse from flip-flop 401 is delayed 6 mic./sec. and the pulse from flip-flop 402 is delayed three mic./sec. Therefore the pulse from flip-flop 402 flips flip-flop 403 to the zero state generating a carry pulse which flips flip-flop 404 to the 1 state. The transition pulse from flip-flop 401, which was delayed 6 mic./sec. changes flip-flop 402 to the 1 state. When flip-flop 404 went to the 1 state a carry pulse was generated from its reset side. It was delayed twice. After the first delay of 12 mic./sec., it triggers flip-flop 403 to the 1 state and after the second delay, which is 3 mic./sec. longer, it triggers flip-flop 402 to the zero state. The transition pulse from flip-flop 402 flips flip-flop 403 to the state, and the 1 to zero pulse from flip-flop 403 flips flip-flop 404 to the zero state generating the seventh output pulse. At this time all flip-flops are in the zero state (Truth Table) and the sequence will continue to repeat for the next ten pulses, multiplying the pulse train by 7/10.

When a binary 8 is in the up-down counter, only the 8 bit has a 1 output and AND gate 408 is primed, allowing pulses on the remaining leg to move through to trigger flip-flop 404. With an 8 in the up-down counter, the incoming pulse train will be multiplied by $K_2/10$ or 8/10.

The first input pulse triggers flip-flop 404 to the 1 state and the transition pulse from the reset side is fed back to sequentially trigger flip-flop 403 and then flip-flop 402 to the 1 state. (See Truth Table IX for condition of all flip-flops after each input pulse.)

The second input pulse triggers flip-flop 404 to the zero state and an output pulse is generated from the set side. (Refer to Truth Table for state of flip-flop.)

The third pulse changes flip-flop 404 to the 1 state and the transition pulse from the reset side, after a 12 mic./sec. delay, sequentially triggers flip-flop 403 to the zero state and 3 mic./sec. later, triggers flip-flop to the zero state and 3 mic./sec. later, triggers flip-flop 402 to the flop 404 immediately to the zero state, generating the second output pulse. The carry pulse from flip-flop 402 changes flip-flop 403 to the 1 state. (Refer to Truth Table for state of all flip-flops.)

The fourth input pulse flips flip-flop 404 to the 1 state and the pulse from the reset side, after 12 mic./sec. delay, triggers flip-flop 403 to the zero state, and 3 mic./sec. later triggers flip-flop 402 to the 1 state. The carry pulse from flip-flop 403, when it changed states, instantaneously triggered flip-flop 404 to the zero state, generating the third output pulse (refer to Truth Table for flip-flop conditions).

Truth Table IX

Truth Table for Setting of 8 in UDC "And" Gate 408 Enabled.

|   | 1 | 2 | 4 | 8 | Output Pulses |
|---|---|---|---|---|---|
| 0 | 10 | 10 | 10 | 10 | |
| 1 |    |    |    | 01 | |
|   |    | 01 |    |    | |
| 2 | 10 | 01 | 01 | 01 | |
|   | 10 | 01 | 01 | 10 | 1 → |
| 3 |    |    |    | 01 | |
|   |    |    |    | 10 | 2 → |
|   |    |    | 10 |    | |
|   |    |    | 01 |    | |
| 4 | 10 | 10 | 01 | 10 | |
|   |    |    |    | 01 | |
|   |    |    | 10 | 10 | 3 → |
|   |    | 01 |    |    | |
| 5 | 10 | 01 | 10 | 10 | |
|   |    |    |    | 01 | |
|   |    | 10 |    |    | |
|   |    |    |    | 10 | 4 → |
|   | 10 | 10 | 10 | 10 | |

Pulses 6 to 10 repeat the cycle.

Truth Table for Setting of 9 in UDC and Gates 405

Truth Table X and 408 Enabled.

|   | 1 | 2 | 4 | 8 | Output Pulses |
|---|---|---|---|---|---|
| 0 | 10 | 10 | 10 | 10 | |
| 1 | 01 |    |    | 01 | |
|   |    |    | 01 |    | |
| 2 | 01 | 01 | 01 | 01 | |
|   | 10 |    |    | 10 | 1 → |
|   |    |    | 10 |    | |
|   |    |    |    | 10 | |
|   |    |    |    | 01 | |
|   |    | 01 |    |    | |
| 3 | 10 | 01 | 01 | 01 | |
|   | 01 |    |    | 10 | 2 → |
| 4 | 10 |    |    | 01 | |
|   |    |    | 10 |    | |
|   |    |    | 10 | 10 | 3 → |
|   |    |    |    | 01 | |
|   |    | 01 |    |    | |
| 5 | 10 | 01 | 01 | 10 | |
|   | 01 |    |    | 01 | |
|   |    |    | 10 | 10 | 4 → |
|   |    |    | 10 |    | |
|   |    |    | 01 |    | |
| 6 | 01 | 10 | 01 | 10 | |
|   | 10 |    |    | 01 | |
|   |    | 01 |    |    | |
|   |    |    | 10 | 10 | 5 → |
|   |    |    | 10 |    | |
|   |    |    | 01 |    | |
| 7 | 10 | 10 | 01 | 10 | |
|   | 01 |    |    | 01 | |
|   |    |    | 10 | 10 | 6 → |
|   |    | 01 |    |    | |
| 8 | 01 | 01 | 10 | 10 | |
|   | 10 |    |    | 01 | |
|   |    | 10 |    |    | |
|   |    |    | 01 |    | |
|   |    |    | 10 | 10 | 7 → |
|   |    | 01 |    |    | |
| 9 | 10 | 01 | 10 | 10 | |
|   | 01 |    |    | 01 | |
|   |    |    | 01 |    | |
|   |    |    | 10 | 10 | 8 → |
|   | 01 | 10 | 10 | 10 | |
| 10 | 10 |    |    | 01 | |
|   |    | 01 |    |    | |
|   |    |    | 01 |    | |
|   |    |    | 10 | 10 | 9 → |
|   | 10 | 10 | 10 | 10 | |

The fifth input pulse triggers flip-flop 404 to the 1 state.

The delayed feedback pulse from flip-flop 404 triggers flip-flop 403 to the 1 state and, 3 mic./sec. later, flips flip-flop 402 to the zero state. The delayed transition pulse from flip-flop 402 changes flip-flop 403 to the zero state and its transition pulse triggers flip-flop 404 to the zero state, generating the fourth output pulse. All flip-flops are in the zero state and the sequence will repeat for the next five pulses. Eight output pulses are generated for every ten input pulses, thereby multiplying the incoming pulse train by 8/10.

When a binary 9 is in the up-down counter, the 1 and 8 bits have a 1 output and AND gates 405 and 408 are partially enabled, allowing pulses on the remaining leg to move through to trigger the respective flip-flops. With a 9 in the up-down counter, the incoming pulse train will be multiplied by $K_2/10$ or 9/10.

The first input pulse triggers flip-flops 401 and 404 to the 1 state and the transition pulse from the reset side of flip-flop 404 is fed back to sequentially trigger flip-flop 403 and then flip-flop 402 to the 1 state. (See Truth Table X for condition of all flip-flops after each input pulse.)

The second input pulse triggers flip-flops 401 and 404 to the 0 state. The transition pulse of flip-flop 404 instantaneously generates the first output pulse. The delayed transition pulse from flip-flop 401 flips flip-flop 402 to the zero state. The delayed transition pulse from flip-flop 402 triggers flip-flop 403 to the 0 state, generating a carry pulse which immediately flips flip-flop 404 to the 1 state. The transition pulse on the reset side of flip-flop 404 sequentially triggers flip-flop 403 and then flip-flop 402 to the 1 state. (Refer to the truth table for state of flip-flops.)

The third input pulse changes flip-flop 401 to the 1 state and flip-flop 404 to the zero state. The second output pulse is generated from this transition. (Refer to truth table for conditions of flip-flops.)

The fourth input pulse changes flip-flop 401 to the zero state and flip-flop 404 to the 1 state. The delayed carry pulse from flip-flop 401 changes flip-flop 402 to the zero state. The transition pulse from flip-flop 402 changes flip-flop 403 to the zero state. The carry pulse from flip-flop 403 instantaneously triggers flip-flop 404 to the zero condition, thereby generating the third output pulse. When flip-flop 404 went to the 1 state, a transition pulse was generated from its reset side and delayed. After 12 mic./sec., it triggers flip-flop 403 to the 1 state and after 15 mic./sec., it triggers flip-flop 402 to the 1 state (refer to truth table for condition of the flip-flops).

The fifth pulse changes flip-flops 401 and 404 to the 1 state. The feedback pulse from flip-flop 404 flips flip-flop 403 to the zero state and its carry pulse immediately triggers flip-flop 404 to the zero state, generating the fourth output pulse. The feedback pulse from flip-flop 404, after a final delay, triggers flip-flop 402 to the zero state, and the carry pulse flips flip-flop 403 to the 1 state. (The state of the flip-flops is as shown in the truth table.)

The sixth input pulse triggers flip-flop 401 to the zero state and flip-flop 404 to the 1 state. The carry pulse from flip-flop 401 triggers flip-flop 402 to the 1 state. The transition pulse from the reset side of flip-flop 404, after a 12 mic./sec. delay, triggers flip-flop 403 to the zero state, and 3 mic./sec. later, changes flip-flop 402 to the zero state. The carry pulse from flip-flop 403 immediately triggers flip-flop 404 to the zero state, generating the fifth output pulse and the carry pulse from flip-flop 402 triggers flip-flop 403 to the 1 state. (Refer to the truth table for state of the flip-flops.)

The seventh input pulse triggers flip-flops 401 and 404 to the 1 state. The feedback pulse from flip-flop 404 first triggers flip-flop 403 to the zero state, then flip-flop 402 to the 1 state. The carry pulse from flip-flop 403 flips flip-flop 404 to the zero state, generating the sixth output pulse. (Refer to the truth table for condition of flip-flops.)

The eighth input pulse changes flip-flop 401 to the zero condition and flip-flop 404 to the 1 state. The transition pulse from flip-flop 401 flips flip-flop 402 to the zero state and the carry of flip-flop 402 triggers flip-flop 403 to the 1 state. The delayed feedback pulse from flip-flop 404 now triggers flip-flop 403 to the zero state and flip-flop 402 to the 1 state. The transition pulse from flip-flop 403 immediately changes flip-flop 404 to the zero state and the seventh output pulse is generated. (Refer to truth table for condition of flip-flops.)

The ninth input pulse triggers flip-flops 401 and 404 to the 1 condition. The feedback pulse from flip-flop 404 first triggers flip-flop 403 to the 1 state, and, 3 mic./sec. later, triggers flip-flop 402 to the 0 state. The delayed carry pulse from flip-flops 402 flips flip-flop 403 to the zero state, and the transition pulse from flip-flop 403 flips flip-flop 404 to the zero state, generating the eighth output pulse. (Refer to the truth table for condition of flip-flops.)

The tenth input pulse triggers flip-flop 401 to the zero state and flip-flop 404 to the one state. The delayed carry pulse from flip-flop 401 triggers flip-flop 402 to the 1 state. The feedback pulse from the reset side of flip-flop 404, after being delayed 12 mic./sec., triggers flip-flop 403 to the 1 state and, 3 mic./sec. later, triggers flip-flop 402 to the zero state, and the transition pulse from flip-flop 403 flips flip-flop 404 to the zero state, generating the ninth output pulse. The flip-flops are now all in the zero state and the multiplier will follow the same sequence for every ten pulses. Since nine output pulses were generated for ten input pulses, the incoming pulse train has been multiplied by 9/10.

For every group of ten pulses of frequency $2f_0$ fed to pulse multiplier decade 311, a single pulse of frequency $f_1$ is fed through AND-gate 316 and delay 319 to pulse multiplier decade 310 (FIG. 12). The latter decade is controlled by the one's decade of the up-down counter, 312, in the same way as that just described with reference to the tens decade. Thus, the pulses being delivered to output OR-gate 320 in a given time are the sum of those delivered from pulse multiplier decade 311 and pulse multiplier decade 310.

HIGH FREQUENCY TIMING REQUIREMENTS

It was mentioned previously that there would be an explanation for the use of $2f_0$ frequency pulses, which are at least 20 times the rate of any pulses from pulse divider unit 100. In the worst case, ten of these $2f_0$ pulses will occur in one-half the time between pulses of frequency $f_1$. For example: when a lead of 1.5″/rev. and a feed rate 5¾″/min. have been set on the proper dials of the machine, the motor stepping rate is 460 steps/second and the pulse generating system output is 6900 p.p.s. The time between $f_1$ frequency pulses is $1/460=t=2,170$ microseconds. This is also the maximum time that can be allowed for the pulse multiplier system to complete its operations.

However, the pulse rate from the pulse generating system, when doubled in doubler unit 150 becomes 13,800 p.p.s. The time between these pulses is $1/13,800=72.5$ microseconds, and for a burst of ten is 725 microseconds. Thus, $2,170-725=1,445$ microseconds remaining before the next $f_1$ frequency pulse.

Figure 14:
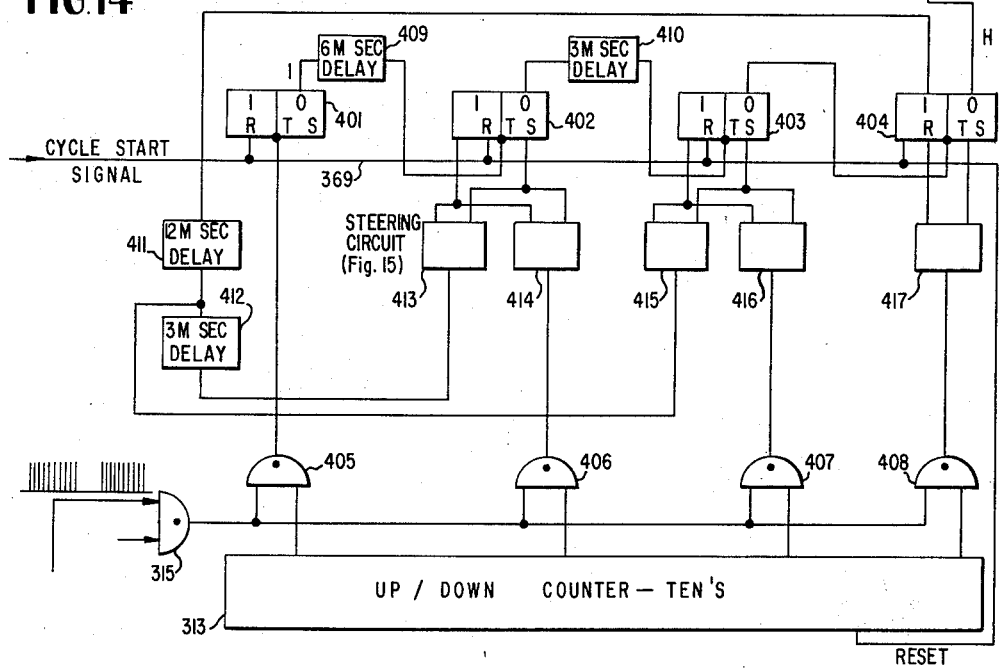
FIGURE 14 is a block diagram of the ten's decade of the pulse multiplier unit.

Part of the remaining time is consumed in various delays designed into the pulse multiplier system (see FIG. 14).

One such delay (150 microseconds) occurs in delay unit 319, in feeding the pulse train to the one's pulse multiplier decade 310. A delay between inputs is necessary to avoid superimposing the outputs from decade 311 on those of decade 310. The delay permits the outputs from both decades to be summed in OR-gates 320 and transmitted to accumulator decade 321.

Other delays occur in the pulse multiplier decades themselves, but in no case is more than 40 microseconds required. Therefore, in the example given above:

—725 microseconds (10 pulses)
—150 microseconds (sequential feeding delay)
—40 microseconds (decade delay)
---
—915 microseconds (total delay time)
+2170 microseconds (time between $f_1$ frequency pulses)
---
+1265 microseconds (time before next pulse burst)

The time before the next pulse burst insures that all multiplier functions are complete before the next pulse from pulse divider unit 100.

INDEXING

In the cutting of a twist drill, which is being used as an illustrative example of the capability of this invention, the end of cutting of one helix is followed by the beginning of the cutting of the next helix. This requires location of the workpiece in an exact angular position. The movement of the workpiece to this position is dependent upon a number of factors. First, it depends upon the number of helices which are to be cut, since these are usually evenly distributed in the 360° constituting the complete circumference of the workpiece. Second, it depends upon the angular position at which the cutting of the preceding helix ended, since the workpiece will have to be moved through a certain angle from that position to the position where the cutting of the new helix is to start.

A basic instrumentality in determining the angular motion from the end of cutting one helix to the beginning of cutting of the next is a counter 400 (FIG. 5), previously mentioned, called the main counter. This is a four decade preset down counter, which records the angular displacement of the workpiece. Each pulse that steps the motor is registered in the counter and accounts for $1/7200$ of a turn of the workpiece. At the start of each machining cut, the counter 400 is preset with a number equal to the steps required to rotate the workpiece through one index, that is, from the start of the cutting of one helix to the start of the cutting of the next helix. Each pulse that steps the motor during helix generation is fed into the main counter and decreases the number in the counter by one. As pulses continue to step the motor, the counter may eventually count to zero. At this time it will automatically be reset to 7200, through the action of a logic device 420, which consists simply of a circuit which, on receiving a carry pulse from the counter when it passes to zero, presets the two highest decades of the counter to 7 and 2 respectively. The continuing pulses now count the counter down from 7200. This action can be repeated as many times as is necessary in machining the workpiece. When pulses from the helix generating system stop at the completion of the cutting of one helix, the number remaining in the counter is the number of pulses that must be supplied by the index pulse generating unit, soon to be described, to position the workpiece for the next helical cut.

The following examples will illustrate the action of the counter:

Number 1

Number of indexes required _____ 4.
Pulses required for 1 index _____ 1800.
Preset to counter _____ 1800.
Total length of cut _____ 2.20".
Lead of helix _____ 11.00"/rev.

$\frac{2.20''}{11.0''}$/rev.=⅕ rev.

Since 7200 pulses=1 rev.
Then 7200/5=1440 lead pulses generated in length of cut
Since the counter has been preset to 1800
  1800 preset of counter
  —1440 lead pulses generated in length of cut
---
  360 left in counter 360 pulses must be supplied by the index pulse generating unit to bring the workpiece into position for machining the next helix.

Number 2

If the length of cut is changed to 5.5", then $\frac{5.5''}{11.0''}$/rev.=½ rev.

Since 7200 pulses=1 rev.
Then 7200/2=3600 lead pulses generated in length of cut
  3600=pulses into counter
  —1800=preset of counter
---
  1800=pulses in excess
After 1800 pulses the counter was reset to 7200, then
  7200
  —1800
---
  5400 pulses left in counter that must come from the index pulse generating unit to bring workpiece into position for next cut.

NUMBER-OF-INDEXES STORAGE SWITCHES AND MATRIX

The number of helices to be machined in a workpiece is determined by a number set in a number-of-indexes storage switch unit 420 (FIGS. 1 and 5). A resistance diode matrix 426 codes the decimal settings of the dials of the switches into binary numbers. One of these binary numbers is equal to the number of steps required to rotate the workpiece one index. Examples of these are as follows:

| Number of indexes per revolution of work holding spindle: | Number of steps required to rotate work one index |
|---|---|
| 1 | 7200 |
| 2 | 3600 |
| 3 | 2400 |
| 4 | 1800 |
| 5 | 1440 |
| 6 | 1200 |
| 8 | 900 |
| 9 | 800 |
| 10 | 720 |
| 12 | 600 |

When the matrix is placed in a certain condition by any particular setting of the number-of-indexes storage switches 425, it partially enables appropriate AND-gates of a matrix 426, so that when a pulse is fed to it at the proper time, in a manner to be described, the matrix 425 will preset the number into the four decade main counter. The decades of the main counter are in binary coded decimal form appropriate to direct reception from the diode matrix 426 of inputs to set the counter.

Other sections on the number-of-indexes storage switches combine with another resistance diode matrix 427 to put the number of indexes required per revolution of the workpiece into binary code. Outputs from the latter diode matrix are connected to a two decade number-of-indexes counter 428, of the binary coded decimal type. The condition of the matrix 427 enables certain AND-gates in such a way that an enabling pulse, to be referred to later, causes outputs from these AND-gates to preset the number-of-indexes counter 428.

The number-of-indexes counter is a two-decade down counter which keeps a record of the number of indexes that have been completed. It controls the recycling of the machine tool after each index and stops the machine when one workpiece has been completed. It counts down one each time a helix cut stop pulse is generated, at the end of the machining of each helix. As long as there is a number in the counter, AND-gate 429 will have a zero output. Inverter 430 changes the output to a 1, priming a recycle logic unit 431 and AND-gate 432 and when AND-gate 449 is enabled at the end of indexing its one output will enable the recycle logic 431 which in turn will cause the machine tool to recycle.

When the number-of-indexes counter 428 stands at one, the last pulse moves through AND-gate 432 and one additional index is made. The same pulse, delayed, in delay unit 433, changes the counter 428 to zero, disabling AND-gate 432 and inhibiting the recycle logic so that a one output from AND-gate 449 will have no effect and the machine stops, as will be described more fully presently.

HELIX CUT STOP MATRIX

The helix cut stop matrix 340 consists of logic gates that detect the conditions under which the pulse train from the pulse divider 100 can be stopped. It produces a signal when these conditions are met and (a) stops the helix generating pulses; (b) counts the number of indexes counter down one; and (c) enables the index pulse generating unit to be described in detail presently.

The conditions necessary before the pulse train from the pulse divider 100 can be stopped are as follows:

(a) The cutter is out of the workpiece. This condition is necessary to avoid the possibility of indexing while the cutter is in the workpiece. It is determined by the tripping of switch 19 (FIG. 1), which is caused by the lowering of the table when the cutter is withdrawn from the workpiece and which generates an end-of-cut signal on line 330 (FIG. 5).

(b) The acceleration-deceleration control unit 300, has provided a signal on line 339 which indicates the motor has decelerated to the number set in the storage register 333 (FIG. 12). This shows that the workpiece can be stopped instantaneously and accurately.

(c) An even number is in the main counter, indicated by a signal on line 342. The reason for this condition will be described later.

INDEX PULSE GENERATING UNIT

As previously stated, a separate index pulse generating unit 435 is provided to supply the stepping motor unit S with a pulse train for indexing. This separate source of index pulses operates at a maximum speed of 670 steps/ second, thereby reducing the time required to index and increasing the productivity of the machine tool. In order to avoid exceeding the capability of the stepping motor it is necessary to accelerate the number of steps per second in starting the index and to decelerate the rate of pulses when the motor is being stopped. In this particular machine the starting pulse rate is 65 pulses per second. This rate is changed as rapidly as permitted by the maximum capabilities of the motor, thereby minimizing the time required to complete an index.

The index pulse generating unit 435 and its means for accelerating pulses from a low rate of 65 p.p.s. to a high rate of 670 p.p.s. are shown in FIG. 8. It comprises a relaxation oscillator including a unijunction transistor $T_1$ connected to a network to vary its frequency, including a voltage divider consisting of resistor $R_1$ and condenser $C_2$. The output of the relaxation oscillator goes to a single shot multivibrator 436, to shape the pulses into a standard pulse train. The emitter of the unijunction transistor is connected to the junction of the resistance $R_1$ and condenser $C_2$. A voltage source, represented by two batteries marked $V_{HI}$ and $V_{LO}$, respectively, can be connected to the transfer point of a relay 437 alternatively, by operation of the relay. The transfer point of the relay is connected to a voltage divider consisting of a resistor $R_3$ and condenser $C_1$, from which a tap is taken to provide voltage $V_1$ across the voltage divider $R_1$–$C_2$. The circuit operates the following manner: With constant value $V_1$ the frequency of the oscillator will be dependent upon the values $R_1$ and $C_2$. When a voltage $V_1$ is applied across $R_1$ and $C_2$, $C_2$ will charge to voltage $V_1$ through $R_T$. As long as the voltage of $V_E$ is low and back biases the emitter of transistor T, $C_2$ will continue to charge. However, when the voltage $V_{E\ max.}$ (see FIG. 8a) is reached the emitter becomes forward biased and emitter current flows, discharging capacitor $C_2$ to a voltage $V_{E\ min.}$. At this point, emitter current is cut off to a leakage value and $C_2$ will start again to recharge to $V_1$. If capacitor discharge time is neglected the frequency will be determined almost solely by the amount of time required for $C_2$ to charge to $V_{E\ max.}$.

The time required for $C_2$ to charge to $V_{E\ max.}$ can be changed by altering $R_1$, $C_2$, or $V_1$, either individually or in any combination. However, in this case $R_1$ and $C_2$ are held constant and $V_1$ is varied. FIG. 8a shows graphically how this is accomplished. The time, $t=R_1C_2$, required to charge capacitor $C_2$ to 64% of $V_1$ is the same regardless of voltage, but as $V_1$ is increased the slope of the charging curve increases and the time, $t_1$, required to charge $C_2$ to $V_{E\ max.}$ is decreased, thereby increasing the frequency of the oscillator (freg.$=1/t_2$). It can be seen, therefore, that the frequency of the oscillator is a function of $V_1$.

Variation of the voltage $V_1$ is accomplished by changing the voltage across resistance-capacitance network $R_3$, $C_1$. When the system is not being used to index, relay 437 is de-energized and voltage source $V_{LO}$ is placed across $R_3$ and $C_1$ through the normally closed contacts. $C_1$ charges to $V_{LO}$ and the voltage at $V_1$ is such that the oscillator frequency will be 65 p.p.s. When an index start order is generated by the helix cut stop matrix 340, relay 437 is energized. Its contacts place $V_{HI}$ across $R_3$ and $C_1$ and $C_1$ charges through $R_3$ to $V_{HI}$. The voltage $V_1$ across the capacitor $C_1$ increases along the capacitor charging curve to $V_{HI}$ and the frequency of the oscillator increases from 65 p.p.s. to 670 p.p.s. along the same curve. The frequency of the oscillator will remain at 670 cycles per second until a decelerate order from a start index clock counter unit 438 is generated and relay 437 is de-energized. The normally closed contacts again engage voltage source $V_{LO}$ and capacitor $C_1$ now discharges to $V_{LO}$. $V_1$, the voltage across the capacitor, decreases along the capacitor discharge curve and the frequency of the oscillator decreases accordingly to the base rate of 65 p.p.s.

START AND STOP OF INDEXING

When machining of one helix cut is complete and the helix cut stop unit 340 produces a signal, in the manner previously described, to stop the pulse train from the pulse generating unit 7 to the stepping motor unit S, the same pulse is fed through AND-gate 432 to a logic unit 440 for controlling the transmission of pulses from the index pulse generating unit 435 to the stepping motor unit. The unit 440 is enabled and the clock sends an accelerating pulse train to the motor on line 441 through OR-gate 305. Each pulse is also transmitted through OR-gate 342 to the main counter to cause it to count down 1, from the number to which it was preset, under control of the number-of-indexes storage switch unit 425, as previously described. When the main counter has been counted down to less than 200, this condition is detected by logic means in the start index clock counter logic 438 along line 442 and primes the logic. The first even number that occurs after this is detected by helix cut stop matrix 340 and it sends a signal to 438 to completely enable it, logic unit 438 then sends a signal to AND-gate 443, partially conditioning this AND-gate, so that index clock pulses from this time on pass to an index clock acceleration-deceleration up-counter 444. This is a three-decade up-counter, which is reset to zero before it begins to count by a pulse from switch 34 when energized. The counter 444 is connected to a coincidence detector 445 by an output channel 446, while the main counter 400 is similarly connected by a channel 447. The counter 444 then counts up until coincidence is detected with the main counter, which continues to count down. An output signal from coincidence detector network 445 is delivered on line 448 to the start-stop logic unit 440, de-energizing relay 437 (FIG. 8). The clock is then decelerated in the manner previously described and continues to generate pulses until a zero is detected by a signal to AND-gate 449 over line 450 from the main counter presetting unit 420. This AND-gate, additionally conditioned by a clock decelerater signal on line 451 from the start-stop logic for clock pulses 440, issues a signal to the unit 440, stopping pulses to the motor. The workpiece is now in position for machining another helix.

STEPPING MOTOR UNIT

Figure 16:
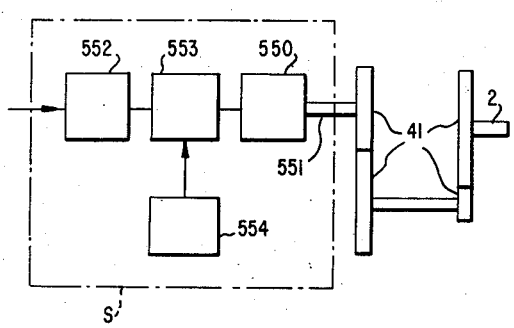
FIGURE 16 is a block diagram of the stepping motor unit.

The stepping motor unit S in FIG. 5 is shown in more detail in FIG. 16. The stepping motor proper, 550, may be any suitable motor capable of responding to pulses by an exact angular movement of its shaft 551. The shaft is connected by reduction gears 41 to the spindle 2. A suitable motor is one marketed under the trade name of "Digitork," supplied by Pace Controls Corportion, of Needham Heights, Massachusetts. The system is composed of three individual units, namely, a control unit 552, a matching unit 553, and the motor 550. In addition, a D.C. power source is required, which is connected to the matching unit of the system. The control unit receives the small control pulses from the control system, shapes and amplifies them, and sends the amplified pulses through the matching unit in the correct sequence for operation of the motor. Supply voltage for the control unit is received from the matching unit. The matching unit serves as the central distribution point for the incremental power supply system. It receives thhe D.C. supply voltage and amplified control pulses from the control unit and applies the pulses to the motor windings.

Sequence of operations

Having described the various parts of the mechanism in detail, a complete operation will now be run through, giving a particular example of the cutting of a twist drill. The following assumptions will be made as to specifications of the twist drill and the operation of the machine.
(A) The overall length of the helix is 3".
(B) The helix to be generated has a 1.5"/rev. lead.
(C) The feed rate selected for machining is 5¾"/min.
(D) Four equally spaced helices are required.
The machine tool is set up by the operator as follows:
(A) The table trip dogs, 32 and 31, are adjusted for the proper length of cut, 3 inches.
(B) The depth of cut is set by adjusting the tracing element (not shown).
(C) The feed rate of the machine is set by handle 24 to 5¾"/min.
(D) The number of indexes of the work spindle is set on the index counter dials 425 to 04.
(E) The desired lead of helix is set on the lead set switches 103, 102, 101 to 01.5.

When the set up has been completed, the machine tool table is brought to the starting position and the operator loads the workpiece.

The following conditions exist at the starting position:
(A) The knee of the machine tool is in the extreme down position and limit switch 19 is closed.
(B) The work table of the machine tool is to the left, tripping switch 27.
(C) The operator presses the "master start" button 500 (FIG. 1). Electrical power is supplied to the machine tool and the helix generating and indexing system.
(a) The hydraulic system starts and supplies hydraulic power to the machine tool.
(b) The feed motor starts and turns the pulse generator at a constant speed. A pulse train, $f_0$ @ 6900 p.p.s., which is proportional to the 5¾"/min. feed rate, is generated in the pulse generating system 7.
(c) The electric power supplied to the stepping motor unit S causes a D.C. current to flow through the motor fields, locking the rotor to the stator with the induced magnetic field.
(d) Index clock pulses are used to reset control logic elements for starting conditions.

To start the machine stroke, the operator presses the "cycle start" button 501 and:
(A) The table moves up at rapid traverse rate to engage the workpiece and cutter.
(B) Limit switch 19 is released.
(C) The number of indexes counter 428 is reset by a pulse on line 369 and then preset to 04 in binary code with the same pulse slightly delayed by unit 502.
(D) Pulses from the pulse generating unit are gated to the acceleration-deceleration control unit to reset the pulse multiplier decades (FIG. 14) to zero.

As the table continues to move up, it trips limit switch 17:
(A) The rapid up rate is discontinued and a feed rate UP is engaged, causing the knee to continue up at feed rate until it engages the stylus of a conventional mechanically operated hydraulic servo-valve or tracer (not shown). The feed up stops and a switch (not shown) is energized, to engage lead screw clutch 503.

When the lead screw clutch is engaged the table starts to move to the right at 5¾"/min. feed rate.

As the table feeds to the right, the lead screw trip dog 35 (FIG. 3) energizes switch 34 generating a pulse which:
(A) Resets the helix cut start-stop logic 80.
(B) Resets flip-flop 301 of the acceleration-deceleration control unit to the not one state, thereby enabling the input to the acceleration-deceleration control unit multiplier (see FIG. 12) and AND gate 304.
(C) Presets the counter of pulse divider 100 to zero.
(D) Resets the main counter to zero and, with the same pulse, slightly delayed in delay unit 504, presets the counter to 1800.

The lead screw continues to turn and the trip dog 35 deenergizes switch 342 generating another signal which:
(A) Sends a pulse through the AND-gate matrix shown in FIG. 11, of the decision unit 200, which presets a 17 in the up-down counter and the storage register 333 of the acceleration-deceleration control unit 300. The number 17/100 is the first factor by which the pulse divider pulse train is multiplied, as the motor is accelerated.
(B) Does not change flip-flop 301 of the acceleration-deceleration control unit, and it remains in the reset condition.
(C) Enables the helix cut pulse train start-stop logic 80 and pulses are gated from the pulse generating unit to the acceleration-deceleration control unit and the pulse divider. The latter divides the pulse generating pulse train by the number in the lead set dials to produce a pulse rate of 460 p.p.s. The acceleration-deceleration control unit multiplies the pulse divider pulse train by 17/100, 18/100, 19/100 ... 99/100 and the output pulses are fed through AND-gate 304 and OR-gate 305 to accelerate the motor in 1% steps to 460 p.p.s. The number 99 is detected in the up-down counter 312, 313, by AND-gate 326. At 100 AND-gate 326 is disabled and the one-to-zero transition triggers single shot multivibrator 327.

The pulse from single shot multivibrator 327 sets flip-flop 301 to the 1 state, with the following results:
(a) AND-gate 303 is enabled by the 1 condition on line 302, while AND-gate 304 is disabled, thereby switching the pulse train from the acceleration-deceleration control unit to the pulse divider 100. The motor is now stepping at the $f_1$ pulse rate, 460 p.p.s., the exact helix cut rate.
(b) Sets the up-down counter 312, 313 to count down, by a pulse through line 328 (FIG. 12).

Each pulse that steps the motor is fed through OR-gate 342 to the main counter 400. When this counter reaches 0, the preset logic unit 420 presets the counter to 7200. The counter continues to recycle.

When the machining cut is complete, the table dog 31 energizes switch 23, with the following results:
(a) The table is brought down at a rapid rate.
(b) Switch 19 is energized when the table bottoms.

(c) The table returns at the rapid rate until table trip dog 28 energizes switch 17. The table then stops and waits for the logic functions to complete and produce a recycle signal.

When the table bottoms and switch 19 is energized, an end-of-cut signal is generated which:

(a) Resets flip-flop 301:

(1) AND-gate 303 is disabled and AND 1 gate 304 is enabled.

(2) The input gates to the pulse multiplier decades, namely 315 and 316, are enabled.

(b) Partially enables helix cut stop matrix 340.

(c) Sends a pulse into up-down counter 312, 313, which is at 0 and set to count down, and its count changes to 99. The pulse train from the pulse divider 100 is now multiplied by 99/100, 98/100, 97/100 . . . 17/100, decelerating the stepping motor in 1% steps to 78.2 steps per second. When the count in the up-down counter reaches 17, coincidence is detected between the counter and the storage register 333 and a "deceleration complete" signal is generated on line 339, partially enablnig helix cut stop matrix 340.

The next following even number that occurs in the main counter after the end-of-cut signal and the deceleration complete signal have been received generates a pulse which is sent to the helix cut stop matrix 340.

The pulse moves through this matrix and is fed over line 344 to the helix cut start-stop unit 80, stopping pulses to the motor.

AND-gate 429, which has a 0 output whenever the number of indexes counter 428 has any number other than a 0 in it, has, at this time, a 0 output. The 0 is changed to a 1 by inverter 430 and partially enables AND-gate 432 and the recycle logic 431. Therefore, the helix cut stop order pulse moves through AND-gate 432 and starts the index clock, by a pulse delivered to start-stop unit 440. The same pulse from matrix 340, slightly delayed in delay unit 433, counts the index counter down to 3.

When the index clock is enabled, the clock is accelerated providing pulses through OR-gate 365 to the stepping motor unit. The motor reaches the maximum clock speed of 670 p.p.s. and remains at this speed until a number less than 200 is detected in the main counter, causing an output on line 442 to start index clock counter unit 438. This unit provides the first condition for AND-gate 443, which therefore passes pulses supplied on line 441 to index clock acceleration-deceleration up counter 444.

This counter counts up the same number of pulses as the main counter counts down, until coincidence is detected by unit 445 between the two counters. Coincidence detector 445 then sends a signal to start-stop unit 440, to de-energize relay 437 (FIG. 8), causing the clock pulses to be decelerated to the base rate of 65 p.p.s.

The output of the clock pulse generator will continue at 65 p.p.s. until a 0 is detected in the main counter preset unit 420, which sends a signal over line 450 to AND-gate 449. The AND-gate passes the signal to start-stop unit 440, stopping the clock pulses to the stepping motor.

The same signal from AND-gate 449 passes to the recycle logic block 431, which is enabled and sends a signal to the machine tool to initiate a repeat cycle for the next helix to be machined.

This cycle is repeated until four helices have been machined, after which AND-gate 429 is enabled, changing the output of inverter 430 to a 0. This output of the inverter disables the recycle logic 431 and the signal from AND-gate 449 has no effect and the machine stops. The operator then unloads the tool.

From the above description it will be seen that a machine tool has been provided which is capable of cutting one or more helical flutes in a workpiece; that the number, lead, and rate of cutting of these helices can be varied within wide limits, the feed of the workpiece and the lead of the helix being independently adjustable. These results are accomplished by a system in which one of the complex movements required to generate the helix is derived from a constant speed motor through adjustable gearing, the other one of the complex movements being produced by a stepping motor operated by pulses from a pulse generating unit driven at a fixed ratio in relation to the rate of the first one of the complex movements.

Where a pulse rate higher than that which the stepping motor is designed to accept from a starting condition is called for, the rate starts within the capability of the motor and is accelerated to the proper pulse rate for generation of the helix. The reverse process takes place on stopping the stepping motor. Consequently, the position of the workpiece is under control at all times and no checking means is required to adjust for errors.

The indexing of the workpiece between cuts takes place at a rate approaching the maximum capability of the stepping motor, again with acceleration and deceleration of pulses, reducing the time for cutting a complete tool to a minimum.

All of the functions are accomplished by a setting means which can be on, or a part of, the machine tool, thus eliminating the need for any record controlled mechanism.

I claim:

1. The method of machining a helical groove in a workpiece of circular cross-section in a machine having a tool and a work-holding spindle, which comprises mounting the workpiece on the spindle to turn and to travel in unison therewith, moving the spindle along a predetermined path relative to the tool at a selected rate, to achieve an operative relation between the mounted workpiece and the tool, generating pulses at a rate dependent upon said selected rate of movement of said spindle along said ptah, and, while the spindle is so moving, rotating the spindle through a predetermined angle for each of a selected number of the generated pulses.

2. The method of machining a workpiece as defined in claim 1, wherein the rotation of the spindle is accelerated by increasing the rate of the number of pulses selected, during rotation of the spindle through a predetermined angle, and wherein the rate of the selected number of pulses is reduced during deceleration of the spindle through a predetermined angle.

3. The method of performing a series of machining operations extending generally along and spaced about an axis of a workpiece, which method comprises alternately performing individual machining operations by moving the workpiece and a tool relative to one another and intermediately indexing the workpiece relative to the tool to a new starting position for each machining operation, each machining operation comprising the steps of moving the workpiece along a predetermined path relative to the tool, at a selected rate, from a starting to a finishing attitude;

generating pulses at a rate dependent upon said selected rate of movement of said workpiece along said path and, while the workpiece is so moving;

rotating the workpiece relative to the tool through a predetermined angle for each of a preselected number of the generated pulses; and withdrawing the workpiece relatively from the tool at each finishing attitude;

each indexing movement of the workpiece being performed by generating pulses and rotating the workpiece relative to the tool by an exactly determined number of said pulses to bring the workpiece from the angular position of the finishing attitude of the preceding machining operation to the starting attitude of the succeeding machining operation.

4. In a machine having a cutting tool, a spindle for holding a piece to be worked on by said tool, means mounting said spindle for rotary movement about its axis, means mounting said tool and said spindle for relative endwise movement of the spindle along said axis,
- a rotary member connected to the spindle for effecting said rotary movement,
- a rotary member connected between the spindle and the tool for effecting said endwise movement,
- actuating means connected to one of said members,
- a stepping motor connected to the other of said members,
- electrical circuit means connected between the actuating means and the stepping motor,
- said circuit means including means connected to and driven by the actuating means and adapted to generate pulses at a rate proportional to the rotational speed of the one member and digital means electrically linked to and monitored by said pulse generating means adapted to feed energy pulses to the stepping motor in timed relation to said rate.

5. In a machine having a cutting tool, a spindle for holding a piece to be worked on by said tool, means mounting said spindle for rotary movement about its axis, means mounting said tool and said spindle for relative endwise movement of the spindle along said axis,
- actuating means connected to the spindle and adapted to effect one of said rotary and endwise movements,
- a stepping motor connected to the spindle and adapted to effect the other of said rotary and endwise movements,
- electrical circuit means connected between the actuating means and the stepping motor governing the operation of the stepping motor,
- said circuit means including pulsing means connected to the actuating means and adapted to generate pulses at a rate proportional to said one movement and monitored by and responsive to said pulsing means, digital means adapted to feed energy pulses to the stepping motor in timed relation to said pulse generation.

6. In a machine tool as defined in claim 5, the digital circuit means comprising adjustable means adapted automatically to feed energy pulses to the stepping motor at a different rate than the pulses are generated by the pulsing means and to maintain a constant ratio between the fed and the generated pulses,
- said adjustable means being adjustable to vary said ratio.

7. In a machine tool as defined in claim 5, the digital circuit means comprising means adapted automatically to feed energy pulses to the stepping motor at a different rate than the pulses are generated by the pulsing means until a predetermined number of energy pulses are fed and thereupon automatically to change the ratio of the pulse feed rate to the pulse generation rate.

8. In a machine tool as defined in claim 7, said automatic feed means being adjustable to vary said ratio.

9. In a machine tool control system,
- a rotatable tool and means for rotating it about its axis,
- a spindle for holding a workpiece to be worked on by said tool,
- means mounting said spindle for rotation about another axis and for endwise travel along its rotational axis relative to the tool,
- actuating means for causing said endwise travel of the spindle,
- a stepping motor operatively connected to the spindle for causing it to rotate about said other axis,
- means connected to said actuating means and adapted to generate electrical pulses at a rate proportional to the endwise travel rate of the spindle,
- and electrical circuit means connected between said pulse generating means and the stepping motor governing the operation of the latter,
- said circuit means including digital means adapted to feed energy pulses to the stepping motor at a rate proportional to the rate at which pulses are generated by said pulse generating means.

10. In a machine having a tool and a rotary work holder,
- driving means for rotating said work holder,
- driving means for feeding said work holder along its axis of rotation in relation to said tool,
- one of said driving means including adjustable means to vary the rate at which it drives said work holder,
- the other of said driving means including a stepping motor;
- pulsing means driven by said one driving means to generate pulses at a rate dependent upon the rate at which said work holder is driven by said one driving means,
- and means controlled by said pulsing means for feeding energy pulses to said stepping motor at a rate dependent upon the rate of the pulses generated by said pulsing means.

11. In a machine having a tool and a rotary work holder,
- driving means for rotating said work holder,
- driving means for feeding said work holder along its axis of rotation in relation to said tool,
- one of said driving means including adjustable means to vary the rate at which it drives said work holder,
- the other of said driving means including a stepping motor,
- pulsing means driven by said one driving means to generate pulses at a rate dependent upon the rate at which said work holder is driven by said one driving means,
- means for feeding energy pulses to said stepping motor, additional rate adjusting means,
- and means for controlling said energy pulse feeding means jointly by said pulsing means and said additional rate setting means.

12. A machine as described in claim 11, wherein said additional rate adjusting means includes means for varying the rate of said energy pulse feeding means while said driving means is driving said work holder.

13. A machine as described in claim 11, wherein said means for controlling said energy pulse feeding means comprises a digital counter,
- means controlled by said adjustable means and said additional rate setting means jointly for presetting said digital counter to a number proportional to the settings of said adjustable means and said additional rate setting means,
- and output pulse means responsive to pulses from said pulsing means and coupled to said digital counter so as to issue pulses at a rate dependent jointly upon the rate of the pulses from said pulsing means and the setting of said digital counter.

14. A machine as described in claim 13, wherein said digital counter is responsive to input pulses to step it to successive new settings, and means for feeding pulses back from said output pulse means to said digital counter.

15. A machine as described in claim 14, wherein said digital counter includes switching means adapted to switch said counter so as to respond to input pulses by stepping either up or down.

16. In a machine having a tool and a rotary work holder,
- driving means for rotating said work holder,
- driving means for feeding said work holder along its axis of rotation in relation to said tool,
- one of said driving means including adjustable means to vary the rate at which it drives said work holder,
- the other of said driving means including a pulse-operated stepping motor,
- and means to deliver pulses to said stepping motor, including pulsing means driven by said one driving means to generate pulses at a base rate, and digital means controlled by said base rate pulses to produce pulses of a different rate,
said digital means being adjustable to vary said different rate of pulses.

17. A machine as described in claim 16, characterized by acceleration-deceleration means alternatively operative to gradually modify the rate of pulses for starting and stopping of said other driving means, said acceleration-deceleration means including feedback means responsive to output pulses therefrom to vary the pulse rate upward on starting and downward on stopping of said other driving means.

18. A machine as described in claim 17, wherein said acceleration-deceleration means includes digital means adapted to control the rate of pulses delivered to said stepping motor in dependence upon the setting of said digital means, and means for feeding back pulses from said pulse delivering means to said digital means to modify the setting thereof.

19. A machine as described in claim 18, wherein said digital means includes means to adjust said digital means to count either up or down in response to said feedback pulses.

20. In a machine having a cutting tool and a rotary work holder,
driving means for rotating said work holder,
driving means for feeding said work holder along its axis of rotation in relation to said cutting tool,
one of said driving means including adjustable means to vary the rate at which it drives said work holder,
the other of said driving means including a stepping motor,
and means for supplying pulses at a controlled rate to said stepping motor including,
pulsing means driven by said one driving means to generate pulses at a base rate,
two alternative means for delivering pulses to said stepping motor at a rate different from, but related to said base rate, one of said alternative pulse delivering means including a pulse divider controlled by said pulsing means, and means to adjust said pulse divider to establish a running rate of pulses for the operation of said stepping motor,
said other alternative means for delivering pulses to said stepping motor including means for receiving base rate pulses from said pulsing means, pulse multiplier means coupled to said receiving means, digital means to variably control said pulse multiplier means in dependence upon the setting of said digital means, and means to feed back pulses from said pulse multiplier means to change the setting of said digital means during the operation of said stepping motor, at a rate dependent upon the rate of delivery of pulses from said pulse multiplier.

21. A machine as described in claim 20, characterized by means to control the settings of said pulse divider and of said digital means, said control means including switching means operated in dependence upon the settings of said pulse divider and of said digital means, means to switch the control of said pulse delivering means alternatively to said pulse divider or to said digital means.

22. A machine as described in claim 21, characterized by means for detecting a limit setting of said digital means for switching said switching means to change the control from said digital means to said pulse divider.

23. A machine as described in claim 21, wherein said pulse multiplier means comprises an electronic counter adapted to issue an output pulse in response to a predetermined number of input pulses,
in combination with means controlled by said digital means for changing the radix of said electronic counter so that it issues an output pulse in response to different numbers of input pulses.

24. In a machine having a cutting tool and a rotary work holder, driving means for feeding said work holder along its axis of rotation in relation to said cutting tool and including a power source and speed control means connecting said power source with said work holder to change the rate of feed of said work holder along its axis,
means for rotating said work holder on its axis including a stepping motor,
means for supplying energy pulses to said stepping motor,
and means for controlling the rate of said energy pulses comprising
pulsing means driven by said speed change means so as to issue pulses at a rate proportional to the rate of feed of said work holder.

25. A machine as described in claim 24, wherein said means for controlling the rate of said energy pulses includes means to vary the rate of said energy pulses in relation to the rate of pulses issuing from said pulsing means.

26. A machine as described in claim 24, characterized by pulse divider means coupled to said pulse generator so as to receive pulses therefrom, lead set switch means controlling said pulse divider means to cause it to issue pulses at a rate depending upon the rate of pulses from said pulse generator and upon the setting of said lead set switch means, and means for coupling the output of said pulse divider to said energy pulse feeding means to control the rate of delivery of pulses to said stepping motor.

27. A machine as described in claim 26, characterized by acceleration-deceleration pulse rate control means adapted to generate pulses to control the rate of energy pulses fed to said stepping motor so as to vary during the operation of said stepping motor,
feedback means responsive to the output pulses of said acceleration-deceleration control means, and
means for controlling said acceleration-deceleration pulse rate control means comprising means jointly responsive to the setting of said speed control means, said lead set switch means, and said feedback means.

28. A machine as described in claim 27, wherein selecting means are provided to switch the control of the rate of pulses fed to said stepping motor alternatively to said pulse divider or to said acceleration-deceleration pulse control means.

29. A machine as described in claim 28, wherein said selecting means is automatically controlled by said speed control means and said lead set switch means.

30. A machine as described in claim 29, wherein means are provided to operate said selecting means in response to the arrival of said acceleration-deceleration pulse rate control means at a predetermined setting.

31. In a machine for cutting multiple grooves in an elongated workpiece and including a cutting tool and a rotary work holder,
means for feeding said work holder along its axis of rotation in relation to said cutting tool from a starting position to an end of groove position,
means for rotating said work holder on its axis comprising a pulse driven stepping motor adapted to turn said work holder through a definite angle in response to a single pulse,
a main counter,
means for feeding driving pulses to said stepping motor and said main counter in unison,
means for setting said main counter to a predetermined count position,
means for disengaging the workpiece from the tool at the end of the cutting of each groove and for restoring said work holder to said starting position,
an indexing pulse source,
means for feeding pulses from said indexing pulse source to said stepping motor and said main counter in unison, means for stopping the feed of pulses from said indexing pulse source to said main counter and said stepping motor in response to the arrival of said main counter at a predetermined count position, and means for re-engaging the cutting tool and the workpiece and for initiating another cutting operation in which the workpiece is rotated by said stepping motor in response to pulses from said driving pulse source as said work holder is fed axially by said power source.

32. A machine for cutting spiral grooves spaced around an axis of a workpiece; said machine being of the type which includes a cutting tool, a work holder, adjustable-rate feed means for feeding one of said work holder and said tool relative to the other axially in forward direction at a selected uniform rate from a starting position to an end-of-groove position and for returning the work holder and the tool by relative movement in the reverse direction to their relative starting positions, and means for engaging the workpiece with the tool for said forward feeding and for disengaging the workpiece from the tool for said reverse feeding; said machine being characterized by:
 means including a pulse operated stepping motor for rotating said work holder relative to said tool;
 means including a source of helix-generating pulses for operating said stepping motor during said forward feeding;
 means for governing said helix-generating pulse source in dependence upon the adjustment of said feed means to produce pulses at a rate proportional to the selected forward feed rate; and
 means including a source of indexing pulses for operating said stepping motor to rotate the work holder relative to the tool, while the workpiece is disengaged from the cutting tool, to index the work holder and the tool to predetermined relative stop positions for starting a new groove.

33. A machine as described in claim 32, characterized by a main counter electrically coupled to said pulse sources and adapted to be stepped thereby,
 means controlled by said main counter for terminating the supply of pulses from said source of indexing pulses to said stepping motor, and
 means for presetting said main counter to a position separated from said index relative stop positions by a number of steps corresponding to one index angle.

34. A machine as described in claim 33, wherein means are provided to reset said main counter, when it reaches said index stop position during a groove cutting stroke of said work holder, to a position separated from said index stop position by a number of steps required to turn the work holder through one complete revolution.

35. A machine as described in claim 33, characterized by means for setting up the number of grooves to be cut in the workpiece, and means controlled by said setting up means for controlling presetting of the main counter.

36. A machine as described in claim 35, wherein said means to control the presetting of the main counter includes means controlled by said setting up means to divide the total number of steps required for one complete revolution of the work holder by the number of grooves to be cut, as set up on said setting-up means.

37. A machine as described in claim 36, characterized by means for counting the number of times the work holder is indexed to new index stop positions, during the cutting of one workpiece, and means controlled by said index counting means for terminating the operation of the machine.

38. A machine for cutting multiple spiral grooves in an elongated workpiece, spaced at predetermined distances around the workpiece, and comprising a cutting tool, a work holder, means to feed the work holder axially in a forward direction at a predetermined rate on cutting strokes and reversely on restoring strokes, means to engage the workpiece with the cutting tool during forward strokes and to disengage the workpiece from the cutting tool during reverse strokes, means to rotate the work holder at a predetermined rate during cutting strokes and to rotate the work holder while the work is disengaged from the cutting tool to a new index position to start the cutting of another groove; said machine being characterized by the fact that the means for rotating the work holder includes:
 a pulse operated stepping motor adapted to turn by uniform steps in response to input pulses,
 means including two pulse sources for supplying pulses to the stepping motor,
 means to render one pulse source effective during cutting strokes to control the rate of pulses in proportion to the rate of feed of the work holder, and means to render the other pulse source effective while the work is disengaged from the cutting tool to supply the exact number of pulses required to move the workpiece from the angular position in which it stopped rotating at the end of the preceding cutting stroke to the new index position.

39. A machine as described in claim 38, which includes counting means responsive to pulses from either of said pulse sources, means controlled by said counting means to terminate the supply of pulses from said second puluse source when said counter reaches a predetermined position, and means for presetting said counter prior to the beginning of a cutting stroke to a position removed from said first mentioned position by a number of counts equal to the number of rotary increments between index positions of the workpiece.

40. In a machine having a cutting tool, a work holder and means for imparting a compounnd movement to the work holder in relation to the tool, comprising two component movements; a first driving means for imparting one of said component movements to said work holder, said driving means including means for varying the speed of said first component movement, and a second driving means for imparting the other one of said component movements to said workpiece, said second driving means including a stepping motor, pulse generator means driven by said first driving means so as to generate pulses at a rate proportional to the speed of said first component movement, and means for transmitting said pulses to said stepping motor.

41. A machine as described in claim 40, wherein said pulse generating means includes means for modifying the rate of said pulses in relation to the rate of said first driving means, so that the rate increases during starting from a stationary condition of the workpiece to a steady high pulse rate during the major portion of the metal cutting operation, and decreases from said high rate to a low rate at the end of the metal cutting operation.

42. A machine as described in claim 40, wherein said pulse generating means includes means for generating a primary series of pulses at a definite rate proportional to the speed of said first driving means, and means for eliminating a variably controlled portion of said primary series of pulses, to generate a secondary series of pulses to control the operation of said stepping motor, said secondary series of pulses starting at a low rate within the response capability of the motor in starting, and increasing incrementally to a high steady rate which is maintained during the major portion of the metal cutting operation.

43. A machine as described in claim 42, wherein said means for generating said secondary series of pulses includes a variable pulse multiplier adapted to deliver to the stepping motor a controlled fraction of the primary series of pulses, a counter controlling said pulse multiplier, and means for delivering pulses from the output of said pulse multiplier to said counter to vary the setting thereof.

44. A machine as described in claim 43, characterized by means including the means for adjusting the speed of said first driving means for presetting said counter to a value adapted to control said pulse multiplier so as to start the delivery of pulses to said stepping motor at a rate within the response capability of said stepping motor.

45. A machine as described in claim 43, characterized by means for presetting said counter, including means controlled by the setting means for said first driving means and additional setting means, and means for combining said two settings so as to preset said counter to a number adapted to control said pulse multiplier so as to cause it to issue pulses initially at a rate within the response capability of said stepping motor.

46. A machine as described in claim 40, wherein said means for transmitting pulses from said pulse generating means to said stepping motor includes means defining two pulse paths, one of said pulse paths being adapted to transmit pulses directly from said pulse generating means to said stepping motor, the other of said pulse paths including means for eliminating a variable number of the pulses supplied thereto from said pulse generating means, whereby pulses are supplied through said second pulse path at an increasing rate until said workpiece is moving at a predetermined limit of working speed, and means for then switching said pulses to said first mentioned path for direct transmission to said stepping motor.

47. A machine as described in claim 45, including means controlled by said counter, upon arriving at a predetermined count, for transmitting pulses directly from said pulse generating means to said stepping motor.

48. A machine as described in claim 40, wherein said counter counts up to a maximum number, combined with means responsive to the arrival of said counter at said maximum number for changing the setting of said counter from an upward counting mode to a downward counting mode.

49. In a machine for making a set of cuts on a workpiece requiring rotation of the workpiece during cutting operations and indexing of the workpiece between cutting operations;
   means including a pulse responsive stepping motor for imparting rotary motion to the workpiece during cutting operations and during indexing,
   a source of driving pulses,
   a source of indexing pulses,
   a pulse operated main counter,
   means for feeding pulses from each of said sources to said main counter,
   pulse responsive means for delivering energy pulses to said stepping motor, and
   switching means controlled by said main counter to couple said pulse sources alternately to said energy pulse delivering means.

50. A machine as described in claim 49, wherein the number of pulses supplied to said stepping motor during the cutting operation are added by said main counter to the number of pulses supplied to said motor during the indexing operation,
   means to preset said counter to a definite number,
   and means operated by said counter on arrival at a second definite number in response to the sum of said pulses, for initiating a new metal cutting operation.

51. In a machine for cutting spiral grooves in an elongated workpiece of round cross section,
   means for holding the workpiece for rotation on its longitudinal axis,
   means for moving the workpiece longitudinally along its axis,
   a metal cutting tool for engagement with the workpiece,
   means including a pulse operated stepping motor for driving the workpiece in a rotary direction about its longitudinal axis,
   means including a pulse generator for supplying pulses to said stepping motor, said pulse generator being adapted to generate pulses at a rate higher than the response capability of said stepping motor when the latter is stationary, and
   means for initially reducing the rate of pulses supplied to said stepping motor, said last means having the capability of increasing the rate of pulses supplied to said stepping motor as the speed of said motor increases.

52. In a machine for shaping a workpiece by cutting material therefrom,
   cutting tool means,
   work holder means,
   means for mounting said means for compound relative motion comprising a rotary component and a linear component,
   settable variable speed driving means for generating one of said components of motion,
   means including a stepping motor for generating the other one of said components of motion,
   and means including pulsing means controlled by said variable speed driving means for delivering driving pulses to said stepping motor,
   whereby the rate of one of said components of motion is a function of the rate of the other of said components of motion.

53. A machine as described in claim 52, characterized by rate adjusting means to vary the ratio of the rate of delivery of driving pulses to said stepping motor to the rate of said variable speed driving means at any given setting thereof.

54. A machine as described in claim 53, wherein said rate adjusting means includes means to vary said ratio progressively during acceleration and deceleration of said stepping motor.

55. A machine as described in claim 54, wherein the progressive variation of said ratio is terminated upon arrival of said stepping motor at a predetermined maximum speed on acceleration.

56. A machine as described in claim 55, wherein the rate of progressive variation of said ratio is dependent upon said predetermined maximum speed.

References Cited by the Examiner

UNITED STATES PATENTS

| | | | |
|---|---|---|---|
| 1,386,279 | 8/21 | Burt et al. | 90—11.42 |
| 2,002,816 | 5/35 | Isler | 90—11.62 |
| 2,094,484 | 9/37 | Bennett | 90—11.62 |
| 2,747,096 | 5/56 | Brockway | 328—38 |
| 2,970,269 | 1/61 | Williams | 328—38 |
| 3,075,095 | 1/63 | Stevens | 307—106 |
| 3,125,931 | 3/64 | Stanaback | 90—11.42 |

WILLIAM W. DYER, JR., *Primary Examiner.*

UNITED STATES PATENT OFFICE
CERTIFICATE OF CORRECTION

Patent No. 3,196,748                                                        July 27, 1965

Carl R. Apthorp, Jr., et al.

It is hereby certified that error appears in the above numbered patent requiring correction and that the said Letters Patent should read as corrected below.

Column 1, line 22, for "flue" read -- flute --; column 7, line 25, for "carried" read -- varied --; column 11, line 8, for "that, is" read -- that is, --; column 13, line 1, for "comprising" read -- comparing --; column 17, line 40, for "1% or 460" read -- 1% of 460 --; column 19, line 38, for "in that" read -- in the --; column 24, line 52, for "flip-flip" read -- flip-flop --; column 27, line 26, strike out "that"; column 29, lines 61 and 62, strike out "zero state and 3 mic./sec. later, triggers flip-flop to the zero state and 3 mic./sec. later, triggers flip-flop 402 to the" and insert instead -- zero state and 3 mic./sec. later, triggers flip-flop 402 to the zero state. The carry pulse from flip-flop 403 flips --; column 30, line 26, strike out "Truth Table for Setting of 9 in UDC and Gates 405" and insert the same after "Truth Table X" in line 28, same column 30; column 36, line 15, for "(freg.=$1/t_2$)" read -- (freg.=$1/t_1$) --; column 39, line 21, for "enablnig" read -- enabling --; line 46, for "therefore" read -- thereafter --; column 40, line 33, for "ptah" read -- path --; column 46, line 21, for "puluse" read -- pulse --; line 29, for "compounnd" read -- compound --.

Signed and sealed this 9th day of August 1966.

(SEAL)
Attest:

ERNEST W. SWIDER                                             EDWARD J. BRENNER
Attesting Officer                                            Commissioner of Patents